US012785917B2

(12) United States Patent
Yamada et al.

(10) Patent No.: US 12,785,917 B2
(45) Date of Patent: Nov. 3, 2026

(54) COMMUNICATION APPARATUS AND COMMUNICATION SYSTEM

(71) Applicant: Sony Semiconductor Solutions Corporation, Kanagawa (JP)

(72) Inventors: Junya Yamada, Kanagawa (JP); Toshihisa Hyakudai, San Diego, CA (US); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 739 days.

(21) Appl. No.: 18/110,046

(22) Filed: Feb. 15, 2023

(65) Prior Publication Data

US 2023/0269062 A1 Aug. 24, 2023

Related U.S. Application Data

(60) Provisional application No. 63/311,648, filed on Feb. 18, 2022.

(51) Int. Cl.
*H04L 5/14* (2006.01)
*H04L 1/00* (2006.01)

(52) U.S. Cl.
CPC .......... *H04L 5/1469* (2013.01); *H04L 1/0061* (2013.01)

(58) Field of Classification Search
CPC ... H04L 5/1469; H04L 1/0061; H04L 1/0041; H04L 1/1685; H04L 1/0045
See application file for complete search history.

(56) References Cited

U.S. PATENT DOCUMENTS

2006/0092871 A1 5/2006 Nishibayashi
2016/0134392 A1 * 5/2016 Effenberger .......... H04L 1/0041 714/776

(Continued)

FOREIGN PATENT DOCUMENTS

JP 2011009827 A 1/2011
JP 2011-239011 A 11/2011

(Continued)

OTHER PUBLICATIONS

Conrad Zerna, ASA Overview and a Proof-of-Concept ASA Transceiver (Automotive SerDes Conference, Oct. 13, 2020) https://auto-serdes.org/wp-content/uploads/2022/08/201013_FraunhoferIIS_AutomotiveSerDes_ASApart.pdf (Year: 2020).*

(Continued)

*Primary Examiner* — Tonia L Dollinger
(74) *Attorney, Agent, or Firm* — Michael Best & Friedrich LLP

(57) ABSTRACT

Communication apparatus and systems are disclosed. In one example, a communication apparatus, which sends and receives information to and from a communication partner apparatus alternately within a period allocated by a TDD communication scheme, includes a PHY, a LINK, decoders and encoders. The PHY receives a first transmission signal conforming to a predetermined communication protocol from the communication partner apparatus, performs error correction on first packets therein, and sends a second transmission signal to the communication partner apparatus. The LINK separates the first packets and aggregates second packets included in the second transmission signal to send the aggregated second packets to the PHY. The decoders decode the first packets. The encoders generate the second packets. The PHY stores error information regarding each of the decoders and the encoders, and includes an operation- (Continued)

administration-maintenance (OAM) unit that includes the error information in one of the second packets.

20 Claims, 29 Drawing Sheets

(56) References Cited

U.S. PATENT DOCUMENTS

| | | | | |
|---|---|---|---|---|
| 2017/0331670 | A1* | 11/2017 | Abrahamsson et al. | H04W 52/028 |
| 2019/0150021 | A1* | 5/2019 | Sugaya | H04L 1/189 370/230 |
| 2020/0021358 | A1* | 1/2020 | Grammel et al. | H04L 43/16 |
| 2023/0198668 | A1* | 6/2023 | Li et al. | H04L 1/0041 370/310 |
| 2024/0146495 | A1* | 5/2024 | Maeda | H04W 72/0446 |

FOREIGN PATENT DOCUMENTS

| | | | | |
|---|---|---|---|---|
| KR | 970076856 A | * 12/1997 | | G11C 11/413 |
| WO | WO-9524786 A1 | * 9/1995 | | H04B 7/02 |
| WO | WO-2015155315 A1 | * 10/2015 | | H04L 45/28 |
| WO | WO-2016149214 A1 | * 9/2016 | | H04L 1/1819 |
| WO | WO-2022009574 A1 | 1/2022 | | |

OTHER PUBLICATIONS

Dalmia Kamal: “ASA MotionLink—Tutorial”, ASA, Sep. 29, 2021 (Sep. 29, 2021), pp. 1-17, XP093082534.

* cited by examiner

3: COMMUNICATION SYSTEM

FIG. 7

Transmission Schedule (OAM Read x4)

| | node1.TX | node2.TX | // operation |
|---|---|---|---|
| uplink#1 | Appli #1 | | // Send Application#1 Config |
| downlink#1 | | Appli #1 | // Return Application#1 Data |
| uplink#2 | Appli #2 | | // Send Application#2 Config |
| downlink#2 | | Appli #2 | // Return Application#2 Data |
| uplink#3 | Appli #3 | | // Send Application#3 Config |
| downlink#3 | | Appli #3 | // Return Application#3 Data |
| · · · | | | |
| uplink#63 | Appli #63 | | // Send Application#63 Config |
| downlink #63 | | Appli #63 | // Return Application#63 Data |
| **uplink#64** | **OAM** | | **// Send OAM Read (PDec#1-#32)** |
| **downlink #64** | | **OAM** | **// Send OAM Return (PDec#1-#32)** |
| uplink#65 | Appli #1 | | **// No Reply** |
| downlink #65 | | Appli #1 | **// No Reply** |
| · · · | | | **// No Reply** |
| **uplink#128** | **OAM** | | **// Send OAM Read (PDec#33-#63)** |
| **downlink #128** | | **OAM** | **// Send OAM Return (PDec#33-#63)** |
| uplink#129 | Appli #1 | | **// No Reply** |
| downlink #129 | | Appli #1 | **// No Reply** |
| · · · | | | **// No Reply** |
| **uplink#192** | **OAM** | | **// Send OAM Read (PEnc#1-#32)** |
| **downlink #192** | | **OAM** | **// Send OAM Return (PEnc#1-#32)** |
| uplink#193 | Appli #1 | | **// No Reply** |
| downlink #193 | | Appli #1 | **// No Reply** |
| · · · | | | **// No Reply** |
| **uplink#256** | **OAM** | | **// Send OAM Read (PEnc#33-#63)** |
| **downlink #256** | | **OAM** | **// Send OAM Return (PEnc#33-#63)** |

FIG. 12

Transmission Schedule (OAM Read x1)

| | node1.TX | node2.TX | // operation |
|---|---|---|---|
| uplink#1 | Appli #1 | | // Send Application#1 Config |
| downlink#1 | | Appli #1 | // Retuen Application#1 Data |
| uplink#2 | Appli #2 | | // Send Application#2 Config |
| downlink#2 | | Appli #2 | // Retuen Application#2Data |
| uplink#3 | Appli #3 | | // Send Application#3 Config |
| downlink#3 | | Appli #3 | // Retuen Application#3 Data |
| . . . | | | |
| uplink#63 | Appli #63 | | // Send Application#63 Config |
| downlink #63 | | Appli #63 | // Retuen Application#63 Data |
| **uplink#64** | **OAM** | | **// Send OAM Read ( )** |
| **downlink #64** | | **OAM** | **// Send OAM Retuen ( )**<br>**// with Extend OAM Header**<br>**// (PEnc Status/PDec Status)** |
| uplink#65 | Appli #1 | | // Send Application#1 Command |
| downlink #65 | | Appli #1 | // Retuen Application#1 Data |
| uplink#66 | Appli #2 | | // Send Application#2 Command |
| downlink #66 | | Appli #2 | // Retuen Application#2Data |
| uplink#67 | Appli #3 | | // Send Application#3 Command |
| downlink #67 | | Appli #3 | // Retuen Application#3 Data |
| . . . | | | |
| uplink#126 | Appli #62 | | // Send Application#62 Command |
| downlink #126 | | Appli #62 | // Retuen Application#62 Data |
| uplink#127 | Appli #63 | | // Send Application#63 Command |
| downlink #127 | | Appli #63 | // Retuen Application#63 Data |
| **uplink#128** | **OAM** | | **// Send OAM Read ( )** |
| **downlink #128** | | **OAM** | **// Send OAM Retuen ( )**<br>**// with Extend OAM Header**<br>**// (PEnc Status/PDec Status)** |

FIG. 13

Additional Extended OAM Header

| Byte | Bit(s) | Name | Description |
|---|---|---|---|
| i | 1:0 | Mode select | 00: normal header, 01: extended header, 1X:Reserved |
| m | 15:0 | FEC Err Time | 1st FEC Error time |
| m+2 | | | 2nd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| p | 15:0 | FEC Err Appli Stateus | FEC Err Appli Stateus[15:0] |
| p+2 | | | FEC Err Appli Stateus[31:16] |
| p+4 | | | FEC Err Appli Stateus[47:32] |
| p+6 | | | FEC Err Appli Stateus[63:48] |
| q | 15:0 | PEnc Stateus | PEnc Stateus[15:0] |
| q+2 | | | PEnc Stateus[31:16] |
| q+4 | | | PEnc Stateus[47:32] |
| q+6 | | | PEnc Stateus[63:48] |
| r | 15:0 | PDec Stateus | PDec Stateus[15:0] |
| r+2 | | | PDec Stateus[31:16] |
| r+4 | | | PDec Stateus[47:32] |
| r+6 | | | PDec Stateus[63:48] |

FIG. 14

Additional Extended OAM Header

| Byte | Bit(s) | Name | Description |
|---|---|---|---|
| i | 1:0 | Mode select(*) | 00: normal header, 01: extended header, 1X:Reserved |
| j | 2:0 | DLL error status | [2] : (1) DLLerrors2<br>[1] : (1) DLLerrors1<br>[0] : (1) DLL transmission Error |
| m | 15:0 | FEC Err Time | 1st FEC Error time |
| m+2 | | | 2nd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| p | 15:0 | FEC Err Appli Stateus | FEC Err Appli Stateus[15:0] |
| p+2 | | | FEC Err Appli Stateus[31:16] |
| p+4 | | | FEC Err Appli Stateus[47:32] |
| p+6 | | | FEC Err Appli Stateus[63:48] |
| q | 15:0 | PEnc Stateus | PEnc Stateus[15:0] |
| q+2 | | | PEnc Stateus[31:16] |
| q+4 | | | PEnc Stateus[47:32] |
| q+6 | | | PEnc Stateus[63:48] |
| r | 15:0 | PDec Stateus | PDec Stateus[15:0] |
| r+2 | | | PDec Stateus[31:16] |
| r+4 | | | PDec Stateus[47:32] |
| r+6 | | | PDec Stateus[63:48] |

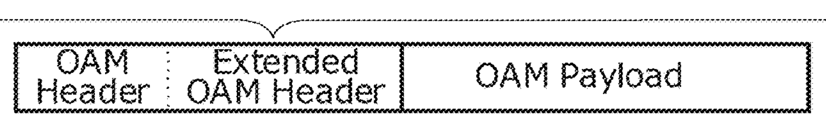

Mode select (2'b01)

FIG. 17

Transmission Schedule2 (OAM Read x1)

| | node1.TX | node2.TX | // operation |
|---|---|---|---|
| uplink#1 | Appli #1 | | // Send Application#1 Config |
| downlink#1 | | Appli #1 | // Retuen Application#1 Data |
| uplink#2 | Appli #2 | | // Send Application#2 Config |
| downlink#2 | | Appli #2 | // Retuen Application#2Data |
| uplink#3 | Appli #3 | | // Send Application#3 Config |
| downlink#3 | | Appli #3 | // Retuen Application#3 Data |
| . . . | | | |
| uplink#63 | Appli #63 | | // Send Application#63 Config |
| downlink #63 | | Appli #63 | // Retuen Application#63 Data |
| **uplink#64** | **OAM** | | **// Send OAM Extended Read ( )** |
| **downlink #64** | | **OAM** | **// Send OAM Extended Return ( )**<br>**// with Error Info**<br>**// (PEnc Status/PDec Status)** |
| uplink#65 | Appli #1 | | // Send Application#1 Command |
| downlink #65 | | Appli #1 | // Retuen Application#1 Data |
| uplink#66 | Appli #2 | | // Send Application#2 Command |
| downlink #66 | | Appli #2 | // Retuen Application#2Data |
| uplink#67 | Appli #3 | | // Send Application#3 Command |
| downlink #67 | | Appli #3 | // Retuen Application#3 Data |
| . . . | | | |
| uplink#126 | Appli #62 | | // Send Application#62 Command |
| downlink #126 | | Appli #62 | // Retuen Application#62 Data |
| uplink#127 | Appli #63 | | // Send Application#63 Command |
| downlink #127 | | Appli #63 | // Retuen Application#63 Data |
| **uplink#128** | **OAM** | | **// Send OAM Extended Read ( )** |
| **downlink #128** | | **OAM** | **// Send OAM Extended Return ( )**<br>**// with Error Info**<br>**// (PEnc Status/PDec Status)** |

FIG. 18

Error Information

| Byte | Bit(s) | Name | Description |
|---|---|---|---|
| m | 15:0 | FEC Err Time | 1st FEC Error time |
| m+2 | | | 2nd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| p | 15:0 | FEC Err Appli Stateus | FEC Err Appli Stateus[15:0] |
| p+2 | | | FEC Err Appli Stateus[31:16] |
| p+4 | | | FEC Err Appli Stateus[47:32] |
| p+6 | | | FEC Err Appli Stateus[63:48] |
| q | 15:0 | PEnc Stateus | PEnc Stateus[15:0] |
| q+2 | | | PEnc Stateus[31:16] |
| q+4 | | | PEnc Stateus[47:32] |
| q+6 | | | PEnc Stateus[63:48] |
| r | 15:0 | PDec Stateus | PDec Stateus[15:0] |
| r+2 | | | PDec Stateus[31:16] |
| r+4 | | | PDec Stateus[47:32] |
| r+6 | | | PDec Stateus[63:48] |

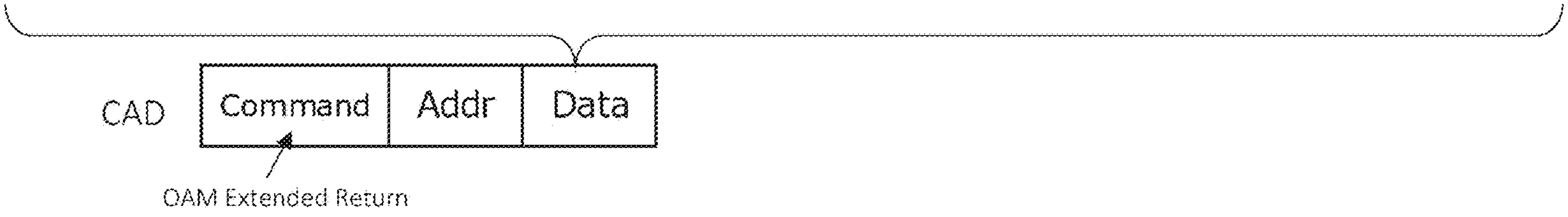

FIG. 19

Error Information

| Byte | Bit(s) | Name | Description |
|---|---|---|---|
| j | 2:0 | DLL error status | [2] : (1) DLLerrors2<br>[1] : (1) DLLerrors1<br>[0] : (1) DLL transmission Error |
| m | 15:0 | FEC Err Time | 1st FEC Error time |
| m+2 | | | 2nd FEC Error time |
| n | 15:0 | FEC Err Count | Accumulate when FEC error occurs. |
| o | 15:0 | FEC Err Appli ID | 1st FEC Error Application ID |
| o+2 | | | 2nd FEC Error Application ID |
| p | 15:0 | FEC Err Appli Stateus | FEC Err Appli Stateus[15:0] |
| p+2 | | | FEC Err Appli Stateus[31:16] |
| p+4 | | | FEC Err Appli Stateus[47:32] |
| p+6 | | | FEC Err Appli Stateus[63:48] |
| q | 15:0 | PEnc Stateus | PEnc Stateus[15:0] |
| q+2 | | | PEnc Stateus[31:16] |
| q+4 | | | PEnc Stateus[47:32] |
| q+6 | | | PEnc Stateus[63:48] |
| r | 15:0 | PDec Stateus | PDec Stateus[15:0] |
| r+2 | | | PDec Stateus[31:16] |
| r+4 | | | PDec Stateus[47:32] |
| r+6 | | | PDec Stateus[63:48] |

COMMUNICATION APPARATUS AND COMMUNICATION SYSTEM

CROSS REFERENCE TO RELATED APPLICATIONS

This application claims the benefit of U.S. Priority Patent Application No. 63/311,648 filed on Feb. 18, 2022, the entire contents of which are incorporated herein by reference.

TECHNICAL FIELD

The present disclosure relates to a communication apparatus and a communication system.

BACKGROUND ART

There is proposed a technology for performing high-speed serial communication between a plurality of apparatuses (Patent Document 1). This type of high-speed serial communication is used in various fields, and is also used for communication between in-vehicle devices, for example.

CITATION LIST

Patent Document

Patent Document 1: Japanese Patent Application Laid-Open No. 2011-239011

SUMMARY OF THE INVENTION

Problems to be Solved by the Invention

With the progress of an automated driving technology and an electronic technology, the necessity of high-speed communication between in-vehicle devices has increased. In the Automotive SerDes Alliance (ASA), it is assumed that high-speed serial communication is performed between a root device and a leaf device connected to a cable in a time division duplexing (TDD) communication scheme.

In the ASA standard Spec V1.01, the leaf device can be provided with up to 126 encoders and decoders that encode or decode up to 63 types of application packets. Error information generated when each of the encoders or decoders encodes or decodes the application packet is stored in, for example, a plurality of registers.

In a conventional communication system, however, it is difficult to collectively read the error information stored in the plurality of registers, and it is necessary to read the error information a plurality of times. Thus, there is a problem that it takes time to read the error information stored in all the registers so that it is difficult to transmit other information in the meantime.

Therefore, the present disclosure provides a communication apparatus and a communication system which enable efficient reading of a plurality of pieces of error information.

Solutions to Problems

In order to solve the problem described above, according to the present disclosure, provided is a communication apparatus that sends and receives information to and from a communication partner apparatus alternately within a period allocated by a time division duplex (TDD) communication scheme, the communication apparatus including: a PHY that receives a first transmission signal conforming to a predetermined communication protocol from the communication partner apparatus, performs error correction on a plurality of first packets included in the first transmission signal, and sends a second transmission signal, which needs to be sent to the communication partner apparatus, to the communication partner apparatus; a LINK that separates the plurality of first packets and aggregates a plurality of second packets included in the second transmission signal to send the aggregated second packets to the PHY; a plurality of decoders that decodes the plurality of first packets; and a plurality of encoders that generates the plurality of second packets, the PHY including an error information storage unit that stores error information regarding each of the plurality of decoders and the plurality of encoders, and an operation-administration-maintenance (OAM) unit that includes the error information in one second packet of the plurality of second packets.

The error information storage unit may store the error information indicating, by one bit, whether or not an error occurs in each of the plurality of decoders and the plurality of encoders.

The error information stored in the error information storage unit may include error information regarding each of a decoder and an encoder included in the OAM unit.

The PHY may perform the error correction on the plurality of first packets included in the first transmission signal, the LINK may generate the second packet including error correction impossibility information for which the PHY has failed to correctly perform the error correction, and the error information may include reception time information of the first packets in which first and second failures have occurred in the error correction within a transmission unit of the TDD communication scheme, total number information of the first packets in which failures have occurred in the error correction within the transmission unit, and identification information of the first packets in which the first and second failures have occurred in the error correction within the transmission unit.

The error information may include the error information of the LINK.

The LINK may include: a first storage unit that stores information indicating a case where there is no information regarding a sending destination in a schedule table or indicating occurrence of an abnormality that the sending destination does not exist; a second storage unit that stores information indicating a case where there is no received data or indicating occurrence of an abnormality during a receiving operation; and a third storage unit that stores information indicating that the received data is partially missing, and the error information of the LINK may include the information stored in the first storage unit, the second storage unit, and the third storage unit.

The plurality of first packets may include at least one of an application packet or a first OAM packet, and the second packet generated by the OAM unit may include a second OAM packet generated in response to reception of the first OAM packet.

The first OAM packet may include a first header and a first payload, the first header or the first payload may include a request for sending of the error information, and the OAM unit may include the error information in the second OAM packet in a case where the first OAM packet includes the request for sending of the error information.

The second OAM packet may include a second header and a second payload, the request for sending of the error information may be included in the first header, and the OAM unit may include the error information in the second header of the second OAM packet in a case where the first header includes the request for sending of the error information.

The second header may include mode select information, and the mode select information may be set to a reserved bit of an OAM header of ASA Spec Ver 1.01 in a case where the second header includes the error information.

The second OAM packet may include a second header and a second payload, the request for sending of the error information may be included in the first payload, and the OAM may include the error information in the second payload of the second OAM packet in a case where the first payload includes the request for sending of the error information.

The error information storage unit may include a plurality of banks storing pieces of the error information generated in mutually different transmission units of the TDD communication scheme, and in a case where a request for sending of the error information of any one bank of the plurality of banks is included in the first OAM packet, the OAM unit may include the error information of the bank in the second OAM packet.

The LINK may clear the error information of a bank other than the bank for which the sending request has been made in the first OAM packet from the error information storage unit.

The LINK may store the error information that is newly generated in at least one or more banks cleared in the error information storage unit in each of the transmission unit.

According to the present disclosure, provided is a communication apparatus that sends and receives information to and from a communication partner apparatus alternately within a period allocated by a time division duplex (TDD) communication scheme, the communication apparatus including: a PHY that receives a first transmission signal conforming to a predetermined communication protocol from the communication partner apparatus and performs error correction on a plurality of first packets included in the first transmission signal; and a LINK that separates the plurality of first packets after the error correction and generates a second packet including error correction impossibility information of the first packet on which the error correction has not been correctly performed. The PHY sends a second transmission signal including the second packet to the communication partner apparatus. The plurality of first packets includes a first OAM packet. The second packet includes a second OAM packet. The LINK includes a register that includes a plurality of banks storing pieces of the error correction impossibility information generated in mutually different transmission units of the TDD communication scheme. In a case where the first OAM packet includes a request for sending of the error correction impossibility information of any one bank of the plurality of banks, the LINK includes the error correction impossibility information of the bank in the register in the second OAM packet.

The error correction impossibility information may include reception time information of an application packet in which a failure has occurred in the error correction for the first time within a transmission unit of the transmission signal and total number information of application packets in which failures have occurred in the error correction within the transmission unit. The first OAM packet may include information designating one bank of the plurality of banks and address information of the register in which the error correction impossibility information of the designated bank is stored. The address information in the first OAM packet may include first address information designating the reception time information in the register and second address information designating the total number information in the register.

The error correction impossibility information may include n (n is an integer of one or more) pieces of reception time information of application packets in which failures have occurred in the error correction starting from the application packet in which the failure has occurred in the error correction for the first time within a transmission unit of the transmission signal and total number information of application packets in which failures have occurred in the error correction within the transmission unit. The first OAM packet may include information designating one bank of the plurality of banks and address information of the register in which the error correction impossibility information of the designated bank is stored. The address information in the first OAM packet may include the n pieces of first address information designating the n pieces of the reception time information in the register and second address information designating the total number information in the register.

The error correction impossibility information may include reception time information of an application packet in which a failure has occurred in the error correction for the first time within a transmission unit of the transmission signal, total number information of application packets in which failures have occurred in the error correction within the transmission unit, identification information of the application packet in which the failure has occurred in the error correction for the first time in the transmission unit of the transmission signal, and bit string information in which whether or not the error correction is impossible is allocated to each of the application packets sent within the transmission unit in units of bits. The first OAM packet may include information designating one bank of the plurality of banks and address information of the register in which the error correction impossibility information of the designated bank is stored. The address information in the first OAM packet may include first address information designating the reception time information in the register, second address information designating the total number information in the register, third address information designating the identification information in the register, and fourth address information designating the bit string information in the register.

According to the present disclosure, provided is a communication apparatus that sends and receives information to and from a communication partner apparatus alternately within a period allocated by a time division duplex (TDD) communication scheme, the communication apparatus including: a LINK that generates a transmission packet including a plurality of first packets; and a PHY that generates a first transmission signal conforming to a predetermined communication protocol on the basis of the transmission packet, sends the first transmission signal to the communication partner apparatus, and receives a second transmission signal from the communication partner apparatus, the LINK including an OAM unit that generates, for the communication partner apparatus, a first OAM packet including a request for sending of error information of a plurality of decoders and a plurality of encoders included in the communication partner apparatus, and extracts the error information from a second OAM packet sent from the communication partner apparatus in response to the first OAM packet, and the plurality of first packets including an application packet and the first OAM packet.

According to the present disclosure, provided is a communication system including: a first communication apparatus; and a second communication apparatus that sends and receives information to and from the first communication apparatus alternately within a period allocated by a time division duplex (TDD) communication scheme. The first communication apparatus includes: a PHY that receives a first transmission signal conforming to a predetermined communication protocol from the second communication apparatus, performs error correction on a plurality of first packets included in the first transmission signal, and sends a second transmission signal, which needs to be sent to the second communication apparatus, to the second communication apparatus; a LINK that separates the plurality of first packets and aggregates a plurality of second packets included in the second transmission signal to send the aggregated second packets to the PHY; a plurality of decoders that decodes the plurality of first packets; and a plurality of encoders that generates the plurality of second packets. The PHY includes: an error information storage unit that stores error information regarding each of the plurality of decoders and the plurality of encoders; and an operation-administration-maintenance (OAM) unit that includes the error information in one second packet of the plurality of second packets.

BRIEF DESCRIPTION OF DRAWINGS

FIG. 7 is a view illustrating a transmission schedule in the root device (a node 1) and the leaf device (a node 2).

FIG. 12 is a view illustrating a transmission schedule between the node 1 and the node 2 in the first embodiment.

FIG. 13 is a view illustrating a configuration of an extended OAM header according to the first embodiment.

FIG. 14 is a view illustrating a modified example of the extended OAM header in FIG. 13.

FIG. 17 is a view illustrating a transmission schedule according to the second embodiment.

FIG. 18 is a view illustrating error information included in an OAM payload.

FIG. 19 is a view in which a DLL error status similar to that in FIG. 14 is added to the error information in FIG. 18.

MODE FOR CARRYING OUT THE INVENTION

Hereinafter, embodiments of a communication apparatus and a communication system will be described with reference to the drawings. Although main components of the communication apparatus and the communication system will be mainly described hereinafter, the communication apparatus and the communication system may have components and functions that are not illustrated or described. The following description does not exclude the components and functions that are not illustrated or described.

Figure 1:
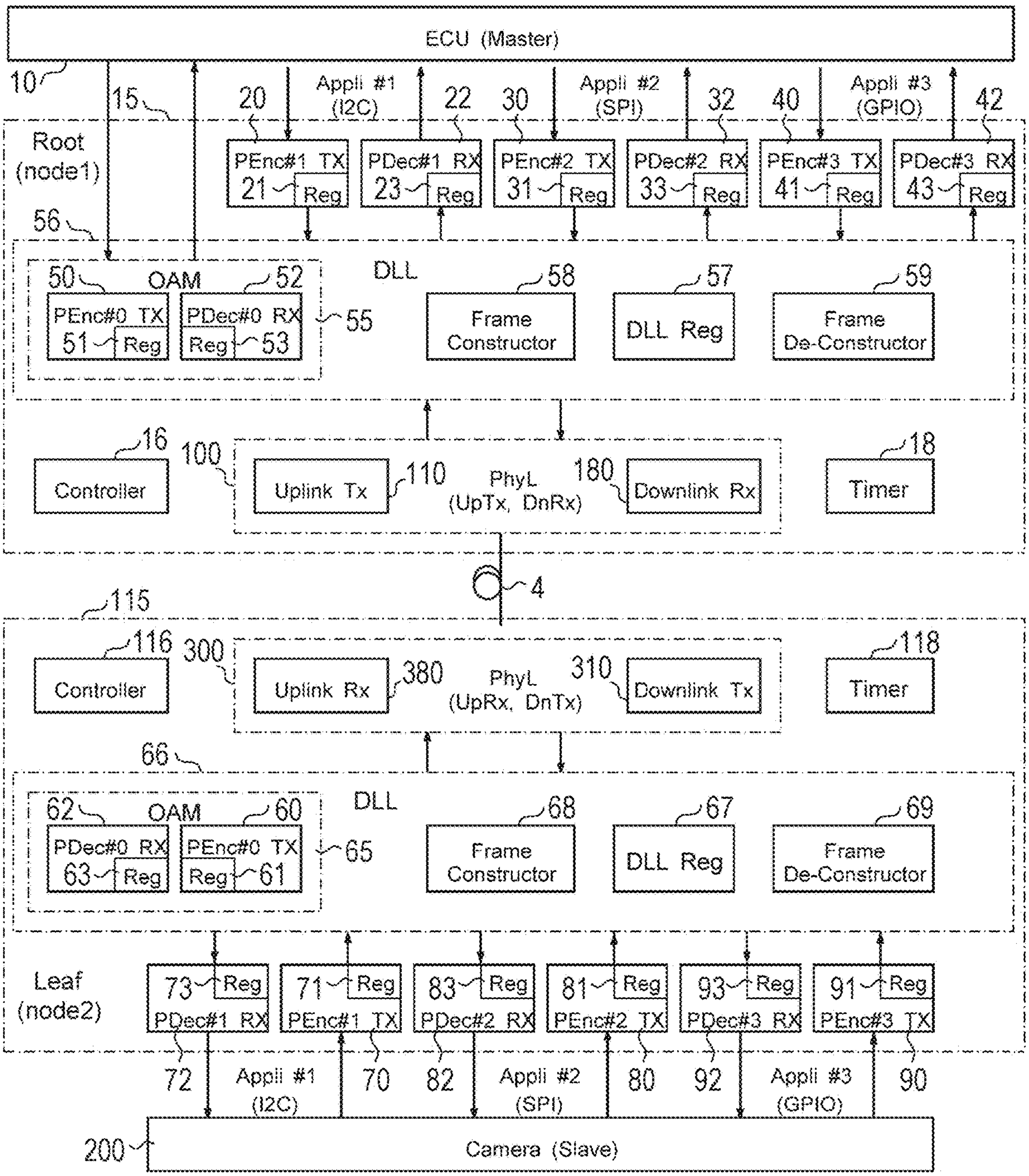
FIG. 1 is a block diagram illustrating a basic configuration of a communication system according to the present disclosure.
Figure 2:
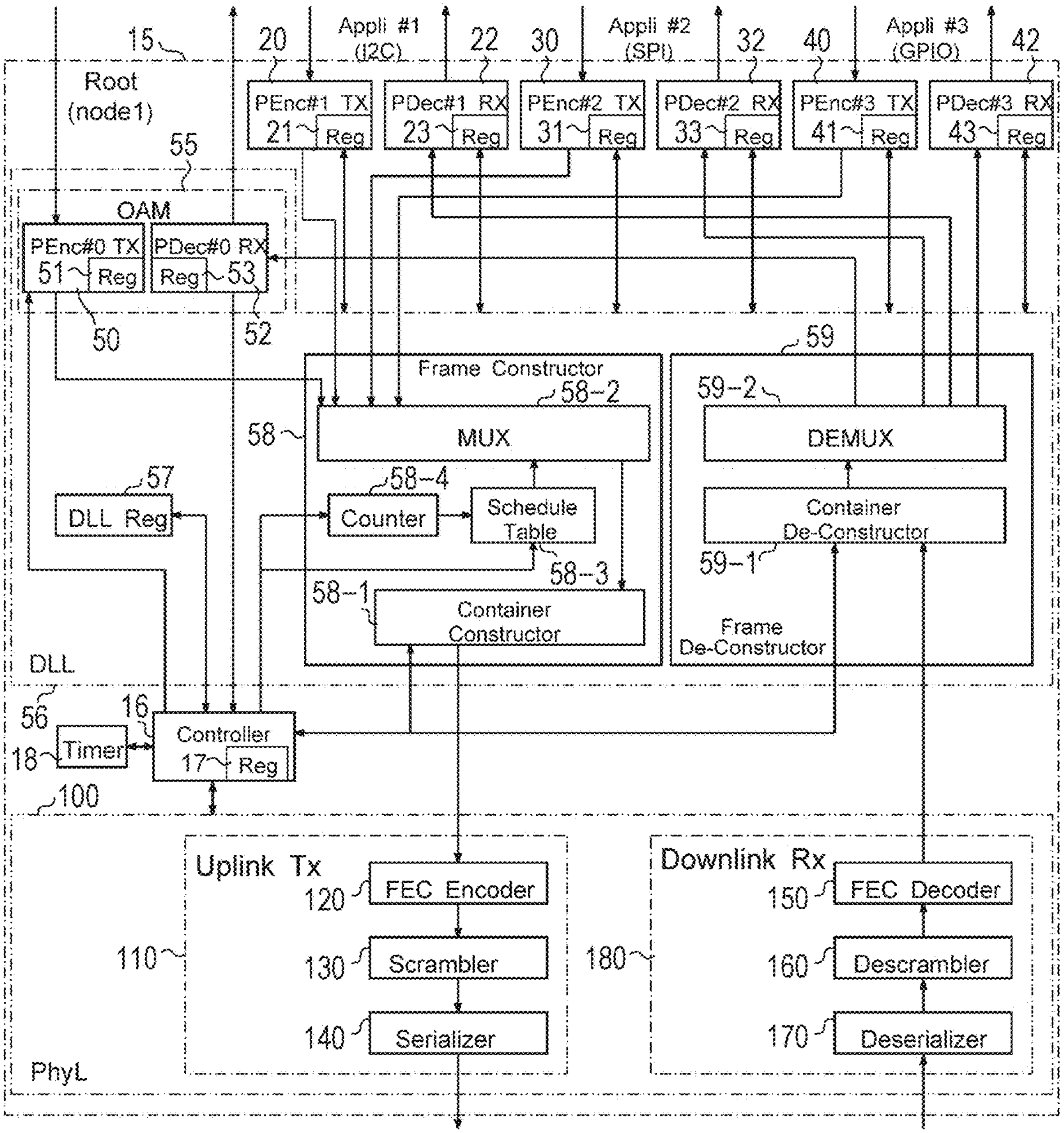
FIG. 2 is a block diagram illustrating an internal configuration of a root device.
Figure 3:
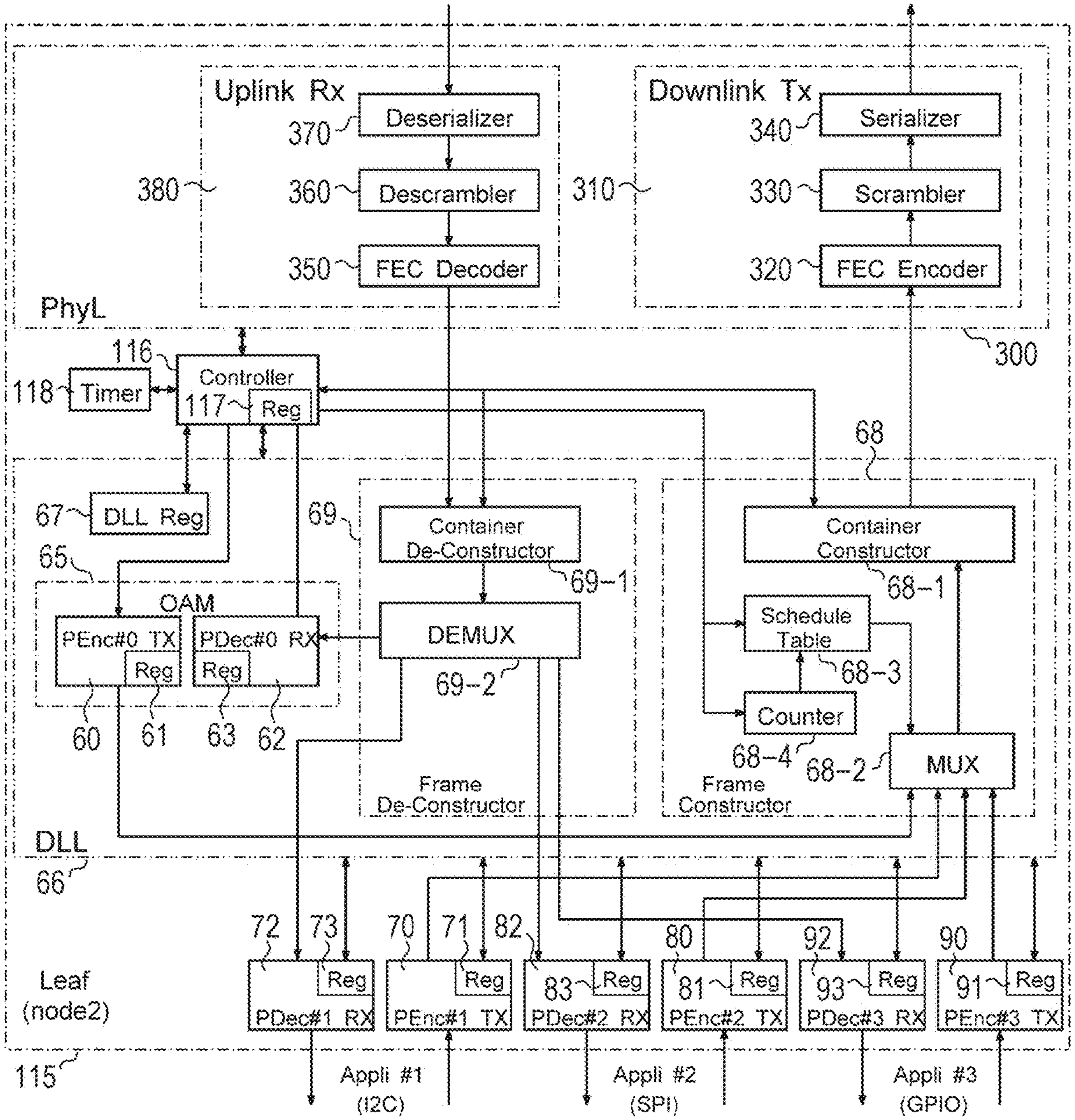
FIG. 3 is a block diagram illustrating an internal configuration of a leaf device.

First, basic configurations and operations of the communication apparatus and the communication system according to the present disclosure will be described. FIG. 1 is a block diagram illustrating the basic configuration of a communication system (3) according to the present disclosure. The communication system (3) in FIG. 1 includes a root device (15) and a leaf device (115). FIG. 2 is a block diagram illustrating an internal configuration of the root device (15), and FIG. 3 is a block diagram illustrating an internal configuration of the leaf device (115). The root device (15) and the leaf device (115) are connected by a cable (4) and can perform high-speed serial communication.

The root device (15) and the leaf device (115) alternately perform serial communication in a TDD communication scheme in conformity with the ASA. In this specification, a path for sending information sent from the root device (15) to the leaf device (115) is referred to as an uplink, and a path for sending information sent from the leaf device (115) to the root device (15) is referred to as a downlink. The uplink and the downlink are virtually provided in the same cable (4). An example in which the root device (15) is located in a node 1 and the leaf device (115) is located in a node 2 will be described hereinafter.

The root device (15) includes an ECU (10), a packet encoder PEnc #1 (20) and a packet decoder PDec #1 (22) for an Internet integrated circuit (I2C), a packet encoder PEnc #2 (30) and a packet decoder PDec #2 (32) for SPI, a packet encoder PEnc #3 (40) and a packet decoder PDec #3 (42) for GPIO, DLL (56), PhyL (100), a controller (16), and a timer (18). Note that types of encoders and decoders of an application packet provided in the root device (15) are not limited to those illustrated in FIG. 1.

The ECU (10) is an example of a master device. The ECU (10) controls the entire system and simultaneously receives and processes an application signal such as a video signal sent from the leaf device (115). The ECU (10) generates a control signal for controlling the respective parts.

PEnc #1 (20), PEnc #2 (30), and PEnc #3 (40) perform encoding processing of encapsulating the control signal from the ECU (10). PDec #1 (22), the PDec #2 (32), and the PDec #3 (42) perform decoding processing of decoding an encapsulated application packet from the leaf device (115) into an original application signal.

The DLL (56) generates an uplink packet including one or more application packets encapsulated by PEnc #1 (20), PEnc #2 (30), and PEnc #3 (40), extracts one or more application packets included in a downlink packet sent from the leaf device (115), and sends the one or more extracted application packets to the corresponding packet decoder PDec.

PhyL (100) outputs a transmission signal including the uplink packet generated by the DLL (56) to the cable (4) in accordance with a timing of TDD, receives a signal including the downlink packet sent from the leaf device (115) to the cable (4), and sends the received downlink packet to the DLL (56).

The controller (16) controls the respective parts in the root device (15). The timer (18) is used to synchronize with the leaf device (115).

An example in which the root device (15) of FIG. 1 sends an application packet including an I2C packet, an SPI packet, and a GPIO packet to the leaf device (115) will be described, but the application packet may include a packet other than the above-described packets.

The DLL (56) includes a frame constructor (58), a frame de-constructor (59), a DLL register (57), and an OAM unit (55).

The frame constructor (58) integrates a plurality of application packets and OAM packets to generate the uplink packet. The frame de-constructor (59) decomposes the downlink packet from the leaf device (115) into a plurality of application packets and OAM packets. The DLL register (57) records error correction impossibility information and the like as described later.

The OAM unit (55) includes PEnc #0 (50), which encodes an OAM packet provided separately from the application packet, and PDec #0 (52) which decodes the OAM packet.

PhyL (100) includes Uplink Tx (110) which sends the uplink packet and Downlink Rx (180) which receives the downlink packet.

The leaf device (115) includes a camera (200), PEnc #1 (70) and PDec #1 (72) for an Internet integrated circuit (I2C), PEnc #2 (80) and PDec #2 (82) for SPI, PEnc #3 (90) and PDec #3 (92) for GPIO, DLL (66), PhyL (300), a controller (116), and a timer (118).

The camera (200) is an example of a slave device. The camera (200) outputs image data, and receives and processes a control signal sent from the root device (15). The camera (200) sends and receives an I2C packet, an SPI packet, and a GPIO packet to and from the leaf device (115).

PEnc #1 (70), PEnc #2 (80), and PEnc #3 (90) perform encoding processing of encapsulating the control signal from the camera (200). PDec #1 (72), PDec #2 (82), and PDec #3 (92) perform decoding processing of decoding the encapsulated application packet from the root device (15) into an original application signal.

The DLL (66) generates a downlink packet including one or more application packets encapsulated in PEnc #1 (70), PEnc #2 (80), and PEnc #3 (90), extracts one or more application packets included in an uplink packet sent from the root device (15), and sends the one or more extracted application packets to PDec #1 (72), PDec #2 (82), and PDec #3 (92).

PhyL (300) outputs a signal including the downlink packet generated by the DLL (66) to the cable (4) in accordance with a timing of TDD, receives a signal including the uplink packet sent from the root device (15) to the cable (4), and sends the received uplink packet to the DLL (66).

The controller (116) controls the respective parts in the leaf device (115). The timer (118) is used to synchronize with the root device (15).

The DLL (66) includes a frame constructor (68), a frame de-constructor (69), a DLL register (67), and an OAM unit (65).

The frame constructor (68) integrates a plurality of application packets and OAM packets to generate the downlink packet. The frame de-constructor (69) decomposes the uplink packet from the root device (15) into a plurality of application packets. The DLL register (67) records error correction impossibility information as described later.

The OAM unit (65) includes PEnc #0 (60), which encodes an OAM packet provided separately from the application packet, and PDec #0 (62) which decodes the OAM packet.

PhyL (300) includes Downlink Tx (310) which sends the downlink packet and Uplink Rx (380) which receives the uplink packet.

Figure 4A:
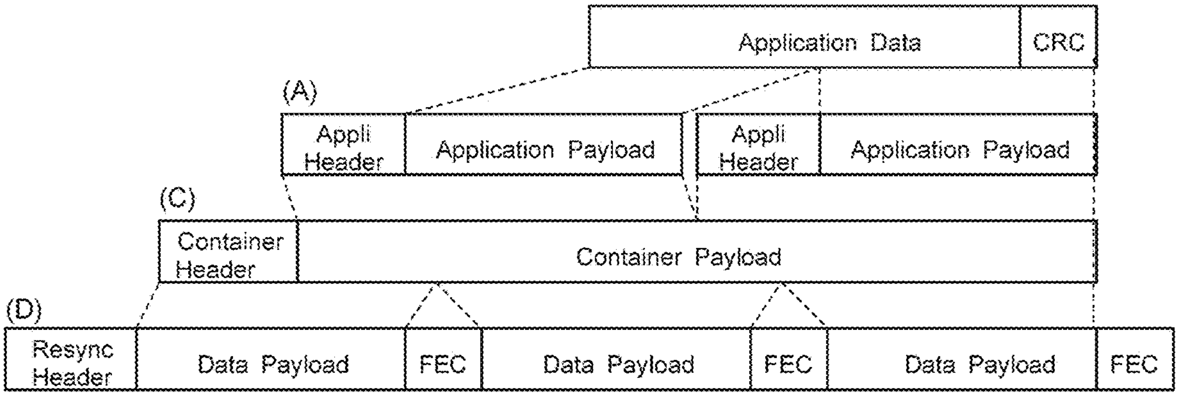
FIG. 4A is a view illustrating a hierarchical structure of an application packet sent and received between the root device and the leaf device.

FIG. 4A is a view illustrating a hierarchical structure of the application packet sent and received between the root device (15) and the leaf device (115).

An application signal input to or output from the ECU (10) or the camera (200) includes application data and a cyclic redundancy check (CRC) which is an error detection code.

As illustrated in FIG. 4A, the application packet output from the packet encoder PEnc or input to the packet decoder PDec includes an application header and an application payload.

An uplink packet or a downlink packet input to or output from the DLL (56) or (66) is also referred to as a container, and includes a container header and a container payload as illustrated in FIG. 4A(C). The container payload includes one or more application packets.

A transmission signal input to or output from PhyL (100) or (300) includes a Resync header and a plurality of data payloads as illustrated in FIG. 4A(D). A forward error correction (FEC) code is added to an end of each data payload.

Figure 4B:
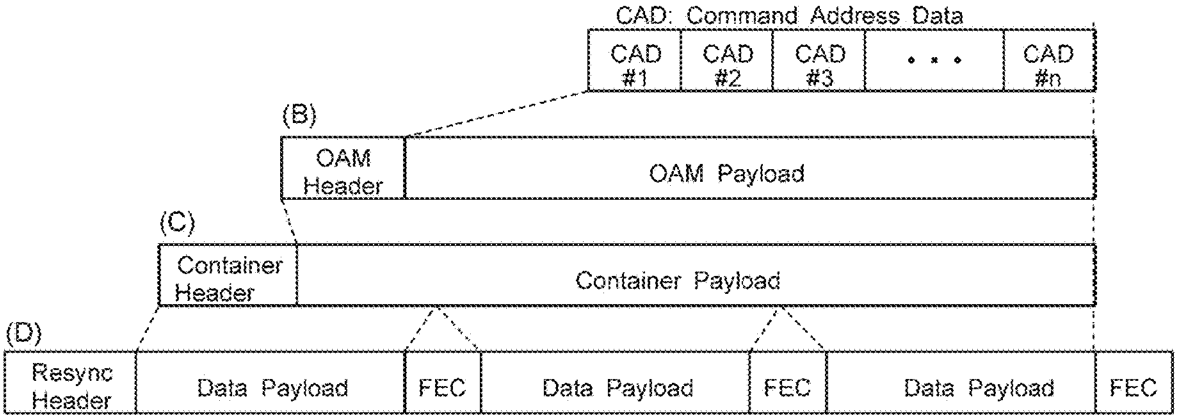
FIG. 4B is a view illustrating a hierarchical structure of an OAM packet sent and received between the root device and the leaf device.

FIG. 4B is a view illustrating a hierarchical structure of the OAM packet sent and received between the root device (15) and the leaf device (115).

The OAM packet is generated by the OAM unit (55) or (65) of the DLL (56) or (66). The OAM unit (55) or (65) includes one or more pieces of command-address-data (CAD) including a command, an address, and data. In a basic configuration of the OAM packet, an error detection code such as a CRC is not added to the CAD.

As illustrated in FIG. 4B, the OAM packet includes an OAM header and an OAM payload.

An uplink packet or a downlink packet input to or output from the DLL (56) or (66) includes a container header and a container payload as illustrated in FIG. 4B(C), and the container payload includes the OAM packet.

A transmission signal input to or output from PhyL (100) or (300) includes a Resync header and a plurality of data payloads as illustrated in FIG. 4B(D), and the data payload includes the OAM packet.

Figure 5:
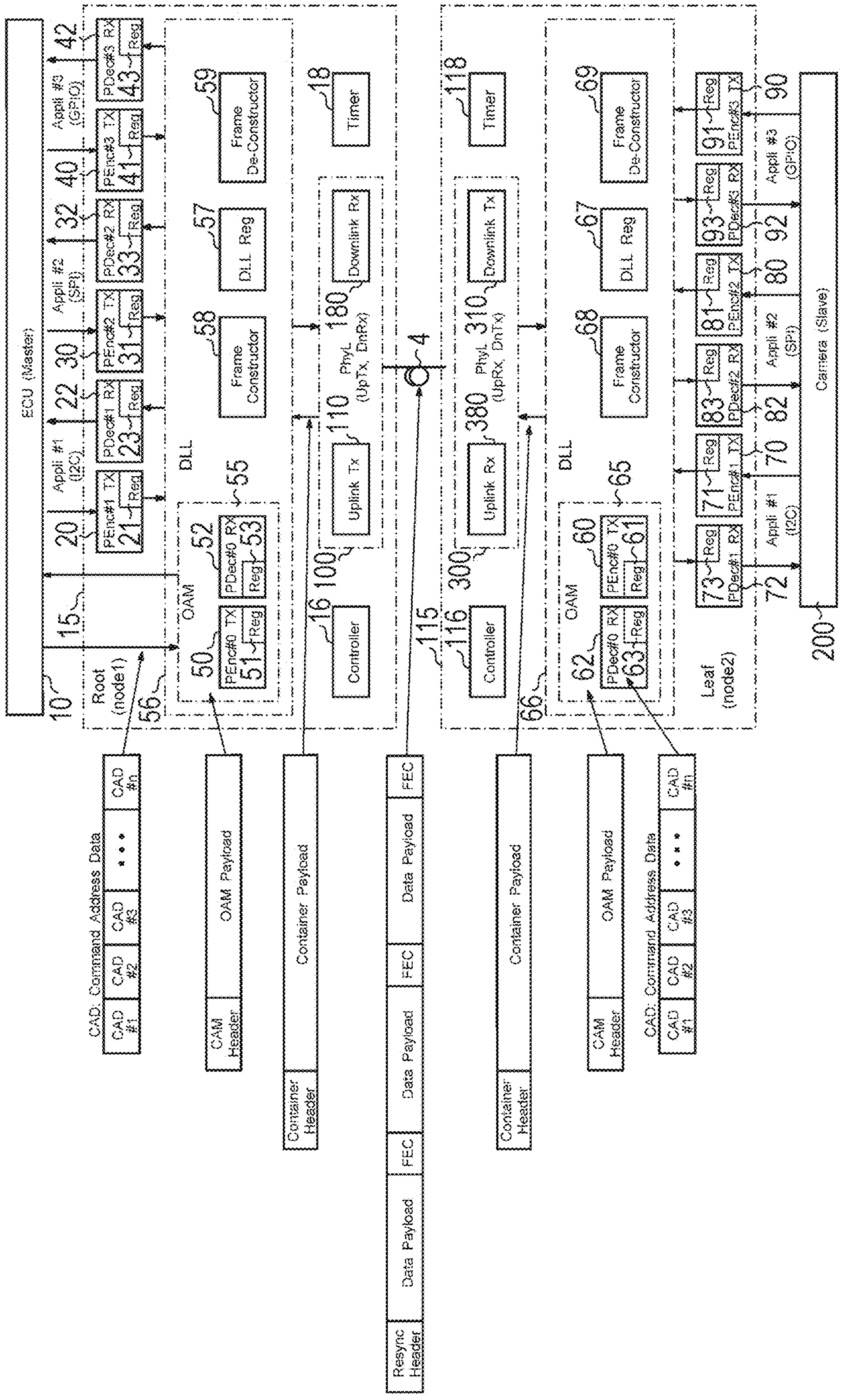
FIG. 5 is a view illustrating processing operations when the OAM packet is sent and received in the communication system of FIG. 1.

FIG. 5 is a view illustrating processing operations when the OAM packet is sent and received in the communication system (3) of FIG. 1. The ECU (10) can send and receive the OAM packet between the root device (15) and the leaf device (115). In the example of FIG. 5, PEnc #0 (50) or (60) is used to generate the OAM packet, and PDec #0 (52) or (62) is used to decode the OAM packet into the original command-address-data (CAD).

PEnc #0 (50) or (60) generates the OAM packet (FIG. 4B) and sends the OAM packet to the DLL (56) or (66). PDec #0 (52) or (62) restores the original CAD from the OAM packet (FIG. 4B) output from the DLL (56) or (66).

When PDec #0 (52) or (62) restores the original CAD from the OAM packet (FIG. 4B), it is difficult to perform error detection of the received OAM packet since a payload of the OAM packet does not include any error detection code such as a CRC.

The DLL (56) or (66) incorporates the OAM packet (FIG. 4B(B)) output from PEnc #0 (50) or (60) into a container (FIG. 4B(C)), and sends the container to PhyL (100) or (300). Furthermore, the OAM packet (FIG. 4B(B)) is extracted from the container (FIG. 4B(C)) output from PhyL (100) or (300), and the OAM packet (FIG. 4B(B)) is sent to the corresponding PDec #0 (52) or (62).

PhyL (100) or (300) converts the container (FIG. 4B(C)) output from the DLL (56) or (66) into a PHY format (FIG. 4B(D)) of the ASA, and sends the PHY format to the leaf device (115) or the root device (15) which is a communication partner apparatus.

In the ASA Spec V1.01, it is possible to provide up to 63 encoders (hereinafter, referred to as PEnc #) and 63 decoders (hereinafter, referred to as PDec #) respectively encoding and decoding the application packet illustrated in FIG. 1 can be provided.

Error information generated in PEnc # or PDec # is stored in a plurality of registers. Error information stored in these registers can be requested to be read in the OAM packet.

However, in the ASA Spec V1.01, the number of registers that can be read at a time among the plurality of registers storing the error information generated in PEnc # or PDec # is limited by an OAM payload size.

For example, in order to read the respective registers (71, 73, 81, 83, and so on) of PEnc #1 to PEnc #63 and PDec #1 to PDec #63 in one OAM packet called OAM read, it is necessary to provide CAD #1 to CAD #126 in an OAM payload of the OAM read. In a case where the maximum number of CADs that can be designated by the OAM packet is smaller than the number of registers to be read, it is necessary to perform reading with a plurality of times of the OAM read in a divided manner, so that a latency time for reading all results becomes a problem.

Figure 6:
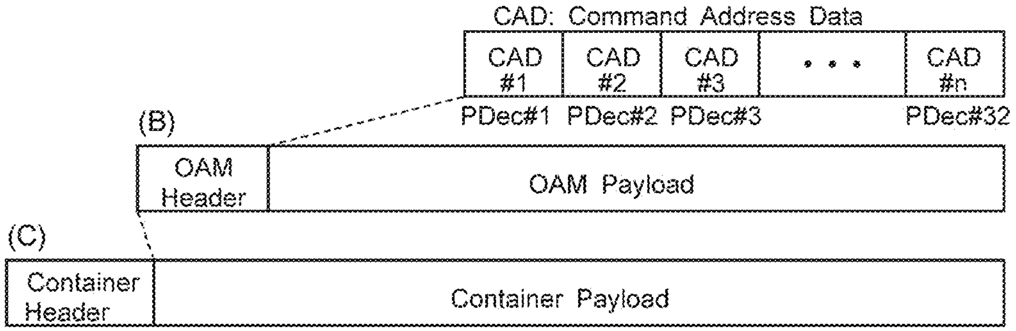
FIG. 6 is a view illustrating an example in which the maximum number of pieces of CAD that can be designated by the OAM packet is 32.

For example, FIG. 6 is a view illustrating an example in which the maximum number of CADs that can be designated by the OAM packet is 32. In this case, it is difficult for the node 1 (the root device (15)) to read all of the 126 registers (PEnc #1 to PEnc #63 and PDec #1 to PDec #63) of the node 2 (the root device (115)) by one OAM read.

Thus, application packets Application #1, Application #2, . . . , and Application #63 need to be allocated to (PDec #1/PEnc #1), (PDec #2/PEnc #2), . . . , and (PDec #63/PEnc #63), respectively, the node 1 needs to repeatedly send the OAM read to the node 2, and the node 2 needs to repeatedly send an OAM return to the node 1.

FIG. 7 is a view illustrating a transmission schedule in the node 1 and the node 2. As illustrated in FIG. 7, the application packets Application #1 to Application #63 and OAM packets are sent and received alternately by an uplink #1 to an uplink #256 and a downlink #1 to a downlink #256.

Figure 8:
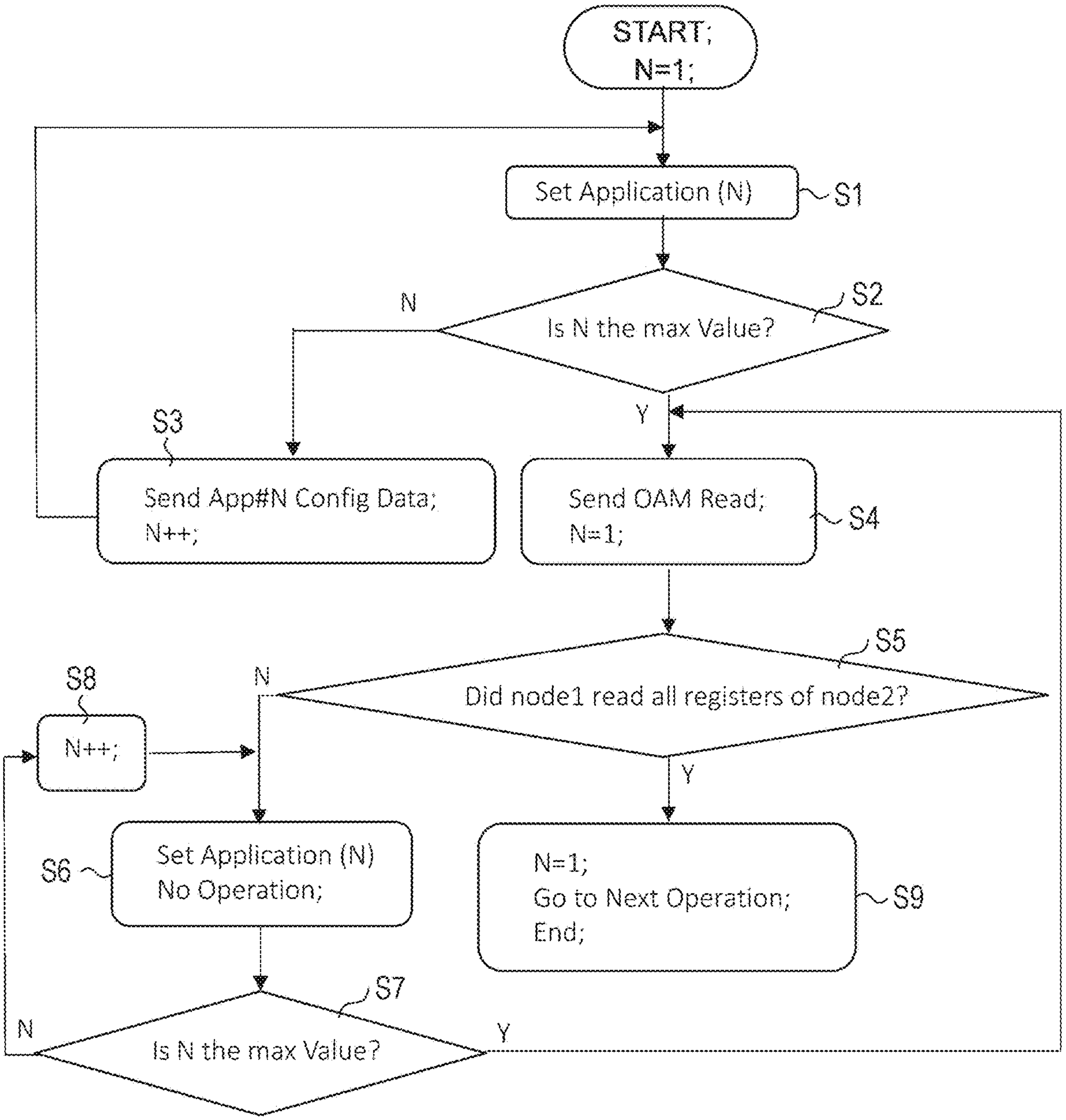
FIG. 8 is a flowchart illustrating a processing procedure in which the node 1 sends OAM read to the node 2 in an uplink.

FIG. 8 is a flowchart illustrating a processing procedure in which the node 1 sends the OAM read to the node 2 in an uplink. First, an identification number N of an application packet is set to N=1 (step S1). Next, it is determined whether or not N is the maximum value (step S2). In a case where it is not the maximum value (in a case of NO in S2), Config data of Application #N is included in the OAM read (step S3), and the processing returns to step S1.

In a case of YES in step S2, the OAM read is sent to the node 2, and N=1 is set (step S4).

Next, it is determined whether or not the node 1 read all the registers of the node 2 (step S5). In a case of NO in step S5, Application #N that has not yet been read is set to stand by (step S6). Next, it is determined whether or not N is the maximum value (step S7). If it is not the maximum value, an increment is added as N=N+1 (step S8), and processes in step S6 and the subsequent steps are repeated.

In a case of YES in step S5, N=1 is set, and the next process is performed (step S9).

Figure 9:
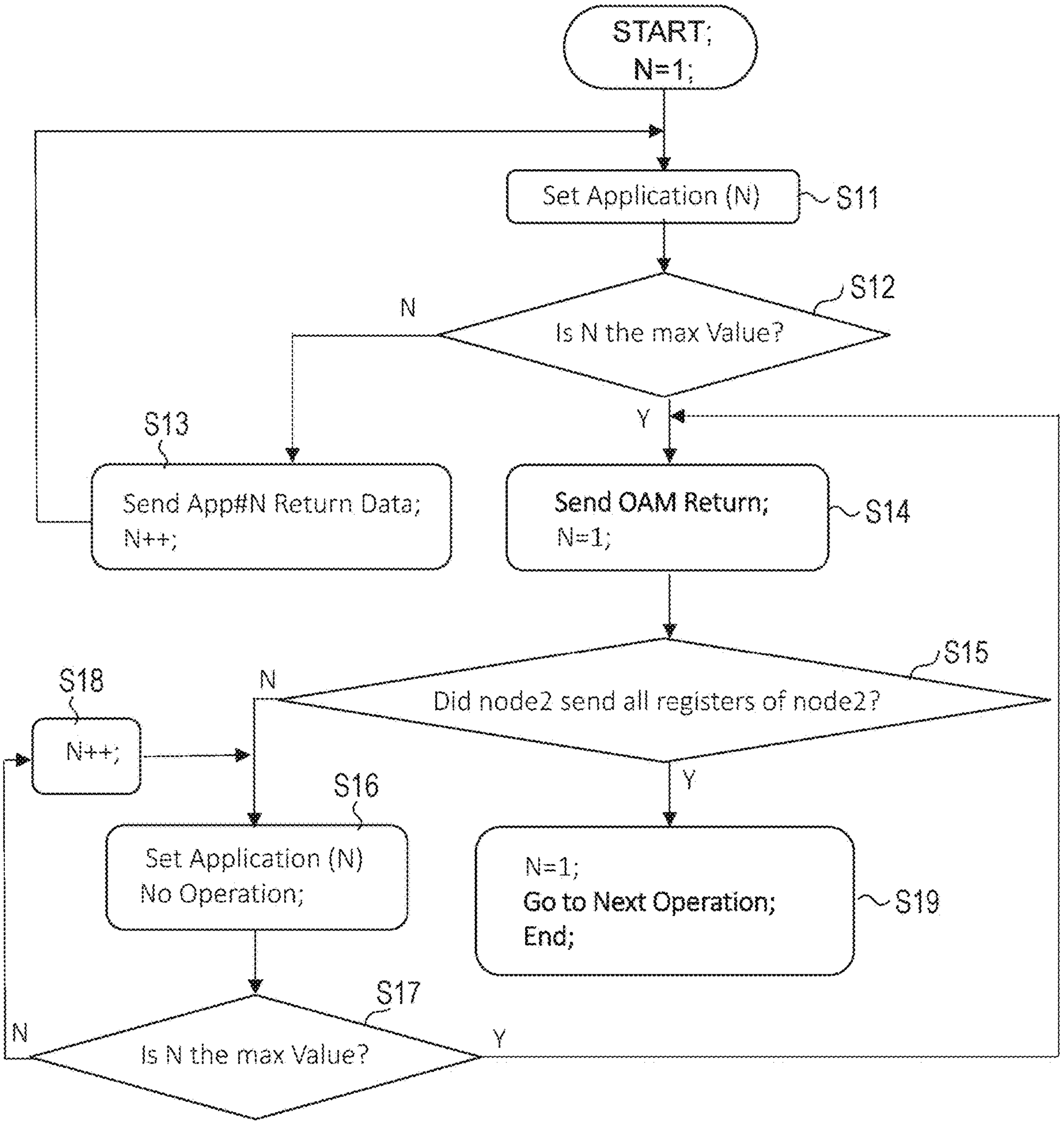
FIG. 9 is a flowchart illustrating a processing procedure in which the node 2 sends an OAM return to the node 1 in a downlink.

FIG. 9 is a flowchart illustrating a processing procedure in which the node 2 sends the OAM return to the node 1 in a downlink. In steps S11 to S13, processes similar to those in steps S1 to S3 in FIG. 8 are performed. In a case of YES in step S12, the OAM return is sent to the node 1 (step S14).

Next, it is determined whether or not the node 2 sent all the registers of the node 1 (step S15). Thereafter, in steps S16 to S19, processes similar to those in steps S6 to S9 in FIG. 8 are performed.

For example, when the maximum number of read addresses that can be sent at a time by the OAM read is 32, the OAM read in the uplinks #64, #128, #192, and #256 (four times in total) is required for designating the read addresses of all the 126 registers (FIG. 7).

More specifically, in the uplink #64, the OAM read is performed to confirm whether Config in Applications #1 to #32 among the respective Applications set in the uplinks #1 to #63 has been correctly received. Similarly, in the uplink #128, the OAM read is performed to confirm whether Config in Applications #33 to #63 has been correctly received. Furthermore, in the uplink #192, the OAM read is performed to confirm whether data in Applications #1 to #32 has been correctly sent. Furthermore, in the uplink #256, the OAM read is performed to confirm whether data in Applications #33 to #63 has been correctly sent.

As a result, it can be seen that Applications #1 to #63 normally perform sending and receiving if there is no error in all of read results in the donwlink #64, the downlink #128, the downlink #192, and the downlink #256, but this causes an increase in latency time in the uplinks/downlinks #65 to #127, #129 to #191, and #193 to #255 corresponding to a loop of steps S6 to S8 in FIG. 8 and a loop of steps S16 to S18 in FIG. 9.

First Embodiment

Figure 10:
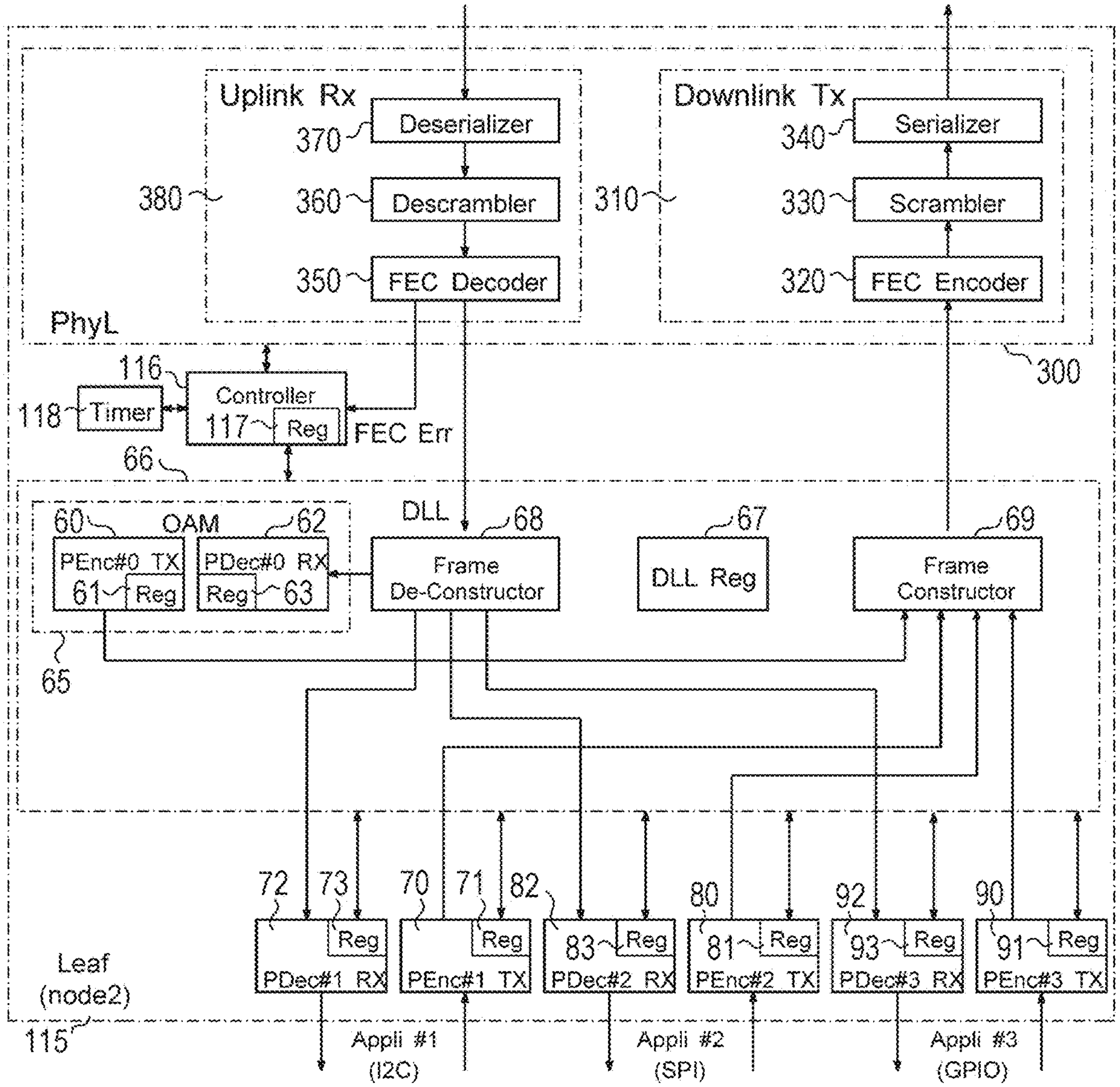
FIG. 10 is a block diagram of a communication apparatus according to a first embodiment.
Figure 11:
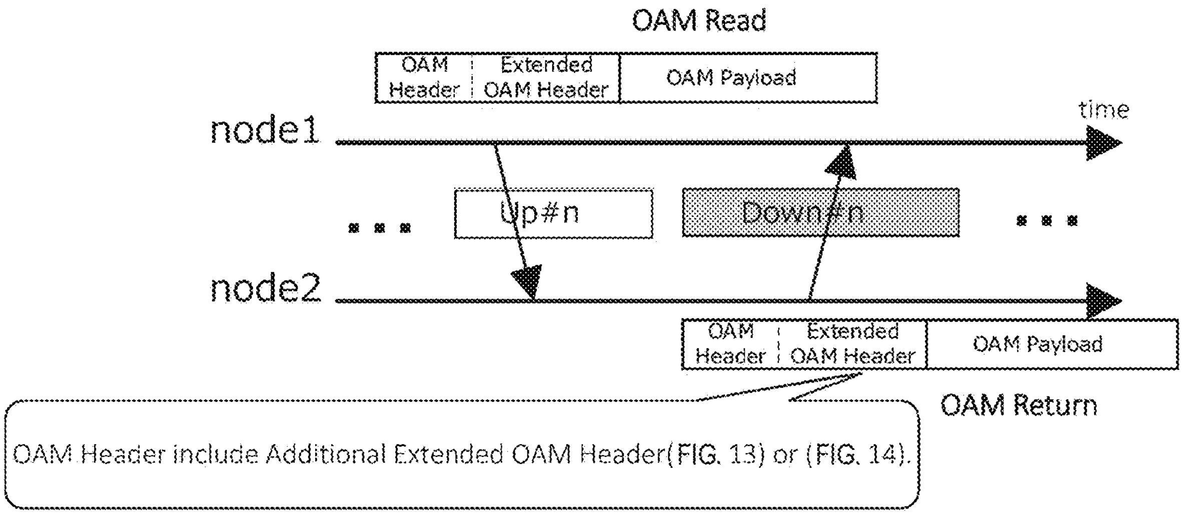
FIG. 11 is a view illustrating packet configurations of the OAM read sent from the node 1 to the node 2 and the OAM return sent from the node 2 to the node 1.

FIG. 10 is a block diagram of a communication apparatus (the leaf device (115)) according to a first embodiment. FIG. 11 is a view illustrating packet configurations of OAM read sent from the node 1 to the node 2 and an OAM return sent from the node 2 to the node 1. FIG. 12 is a view illustrating a transmission schedule between the node 1 and the node 2 in the first embodiment.

As illustrated in FIG. 11, each of the OAM read sent from the node 1 to the node 2 and the OAM return sent from the node 2 to the node 1 has an extended OAM header. As illustrated in FIG. 12, the OAM read and the OAM return are sent and received between times while a plurality of application packets is sent and received.

FIG. 13 is a view illustrating a configuration of the extended OAM header according to the first embodiment. As illustrated in FIG. 13, the extended OAM header according to the present embodiment includes mode select, FEC Err Time, FEC Err Count, FEC Err Appli ID, and FEC Err Appli Status, and further includes PEnc Status and PDec Status. PEnc Status includes pieces of error occurrence information (hereinafter, referred to as error information) of all the encoders PEnc (60, 70, 80, and 90) in the leaf device (115), and PDec Status includes pieces of error information of all the decoders PDec (62, 72, 82, and 92) in the leaf device (115).

In a case where the OAM read including the above-described request for sending of the error information in the extended OAM header is sent from the root device (15), the OAM unit (65) of the leaf device (115) generates the OAM return including the error information in the extended OAM header and sends the OAM return to the root device (15).

In a case where all the pieces of error information described above are included in the extended OAM header, i bytes of the mode select is newly set to reserved bits of an OAM header described in the ASA Spec V1.01 (FIG. 13). If a bit value of the mode select is "00", the OAM header configuration of the conventional ASA Spec V1.01 is maintained, and pieces of error information from FEC Err Time to PDec Status of the extended OAM header are not included. On the other hand, when the mode select is "01", pieces of the error information from FEC Err Time to PDec Status are added as the extended OAM header after the existing OAM header.

FEC Err Time is occurrence time information of first and second FEC errors. Note that occurrence time information of third and subsequent FEC errors may be added. FEC Err Count is a cumulative number of times of occurrence of an FEC error. The FEC Err Appli ID includes application IDs in which the first and second FEC errors have occurred. Note that application IDs in which the third and subsequent FEC errors have occurred may be added. FEC Err Appli Status is information of all the application IDs in which FEC errors have occurred, and for example, 0 represents FEC error application ID #0 and 1 represents FEC error application ID #1.

The communications apparatus in FIG. 10 is the leaf device (115). The leaf device (115) is located in the node 2. In FIG. 10, the same components as those in FIG. 3 are denoted by the same reference signs, and differences will be mainly described hereinafter.

The DLL register (67) of the leaf device (115) located in the node 2 (115) newly has PDec Status Reg [n:0] and PEnc Status Reg [n:0]. PDec Status Reg [n:0] and PEnc Status Reg [n:0] are error information storage units that store error information of all the encoders PEnc (60, 70, 80, and 90) and all the decoders PDec (62, 72, 82, and 92) in the leaf device (115). The OAM return sent from the leaf device (115) to the root device (15) of the node 1 has an extended OAM header illustrated in detail in FIG. 13. The extended OAM header includes values of PDec Status Reg [n:0] and PEnc Status Reg [n:0].

The above-described cause of the latency time for reading the error information is that it is necessary to read register values exceeding the maximum CAD that can be designated in one transmission unit of the uplink. Therefore, in a first solution, if error write occurs in an internal register of each PEnc and each PDec, each PEnc/PDec notifies the DLL (66) of the error write, and the DLL (66) writes 1'b1 indicating the occurrence of an error into a corresponding bit of PDec Status Reg [n:0] and PEnc Status Reg [n:0] of the DLL register (67).

Specifically, in a case where there is error write in PDec #0 Reg (63), PDec #0 notifies the DLL (66) of a PDec error, and the DLL (66) writes 1'b1 indicating that the error write has occurred in PDec #0 Reg into PDec Status [0] of the DLL register (67).

Similarly, in a case where there is error write in PDec #1 Reg (73), the DLL (66) writes 1'b1 indicating that the error write has occurred in PDec #1 Reg into PDec Status [1] of the DLL register (67). In a case where there is error write in PEnc #0 Reg (61), the DLL (66) writes 1'b1 indicating that the error write has occurred in PEnc #0 Reg into PEnc Status [0] of the DLL register (67).

The DLL (66) sends PEnc Status/PDec status information of the DLL register (67) to PEnc #0 (60). PEnc #0 (60) generates an OAM Packet of an OAM return in which information of PEnc Status [n:0] (see FIG. 13) and PDec Status [n:0] (see FIG. 13) is added to extended OAM header of the OAM return.

As a result, regardless of the number of CADs of the OAM payload, the node 2 (115) can transmit the error information of the entire PDec/PEnc to the node 1 (15) in one OAM return in the downlink #64 and the downlink/#128 as illustrated in FIG. 12, and it is possible to eliminate the latency time in steps S6 to S8 of FIG. 8 and steps S16 to S18 of FIG. 9.

FIG. 14 is a view illustrating a modified example of the extended OAM header illustrated in FIG. 13. An extended OAM header in FIG. 14 has a DLL error status (a broken-line frame in FIG. 14) in addition to the configuration in FIG. 13. This DLL error status is obtained by aggregating pieces of DLL error information in the DLL register (67).

In DLL error status [2:0], DLL error status [0], DLL error status [1], and DLL error status [2] represent error states of a DLL transmission error, DLL error 1, and DLL error 2, respectively. The DLL transmission error is information indicating a case where there is no sending destination information in the schedule table or the occurrence of an abnormality that the sending destination itself does not exist.

DLL error 1 is information indicating a case where there is no received data or the occurrence of an abnormality during a receiving operation. DLL error 2 is information indicating that received data is partially missing.

In the case of FIG. 14, pieces of the error information and the DLL error information of all of PEnc (60, 70, 80, and 90) and PDec (62, 72, 82, and 92) in the leaf device (115) are included in the extended OAM header of the OAM return, these pieces of error information can be sent to the root device (15) in one transmission unit of the downlink.

In this manner, in the first embodiment, pieces of the error information of all of PEnc (60, 70, 80, and 90) and PDec (62, 72, 82, and 92) in the leaf device (115) are aggregated and stored in the DLL register (67), and these pieces of error information are collectively written in the PEnc Status and PDec Status of the extended OAM header. Thus, the root device (15) located in the node 1 can acquire the error information of all of PEnc (60, 70, 80, and 90) and PDec (62, 72, 82, and 92) in one transmission unit of the downlink by sending the OAM return including the extended OAM header from the node 2 to the node 1. Thus, the latency time does not occur in acquiring the error information of all of PEnc (60, 70, 80, and 90) and PDec (62, 72, 82, and 92), and TDD communication can be efficiently performed.

Second Embodiment

Although the example in which the error information of all of PEnc (60, 70, 80, and 90) and PDec (62, 72, 82, and 92) is included in the extended OAM header of the OAM return has been described in the first embodiment, error information of all of PEnc (60, 70, 80, and 90) and PDec (62, 72, 82, and 92) is included in an OAM payload of an OAM return in a second embodiment.

Figure 15:
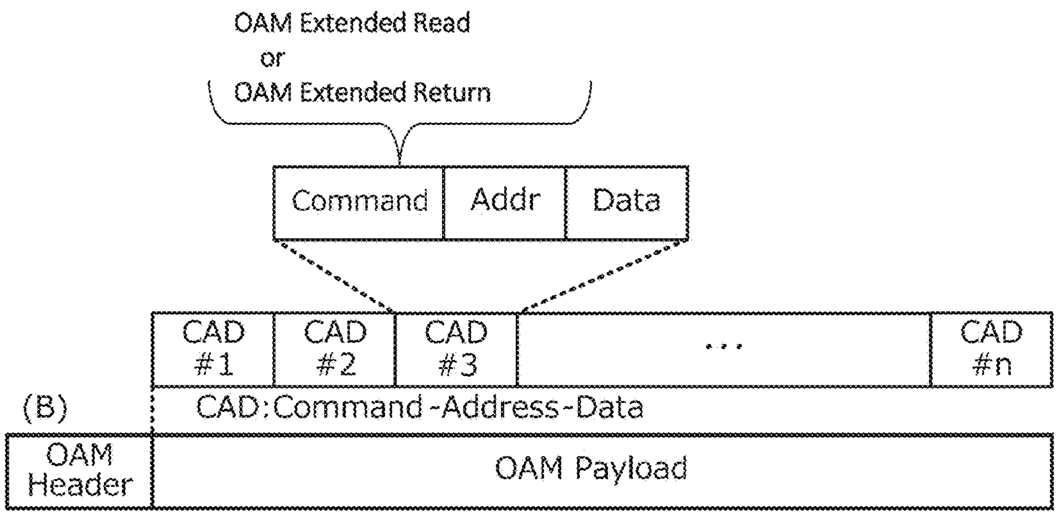
FIG. 15 is a view illustrating a configuration of an OAM payload according to a second embodiment.
Figure 16:
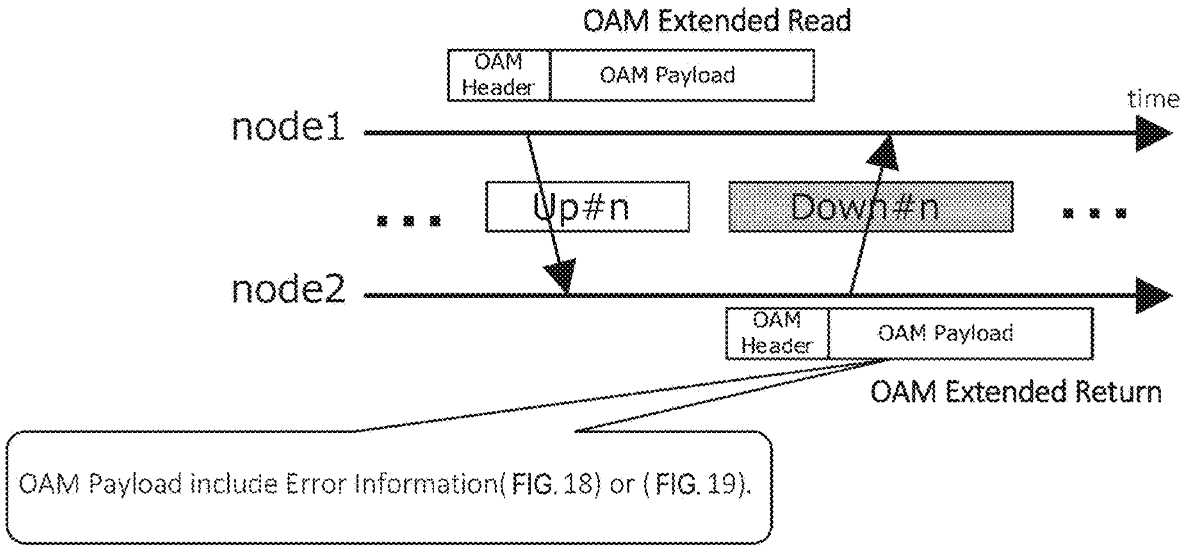
FIG. 16 is a view illustrating packet configurations of OAM extended read sent from the node 1 to the node 2 and an OAM extended return sent from the node 2 to the node 1.

A communication apparatus (the leaf device (115) of the node 2) according to the second embodiment has a block configuration similar to that in FIG. 10. FIG. 15 is a view illustrating a configuration of the OAM payload according to the second embodiment. FIG. 16 is a view illustrating packet configurations of OAM extended read sent from the node 1 to the node 2 and an OAM extended return sent from the node 2 to the node 1. FIG. 17 is a view illustrating a transmission schedule in the second embodiment. FIG. 18 is a view illustrating the error information included in the OAM payload. The error information of FIG. 18 is the same as the error information of FIG. 13 except that there is no mode select. FIG. 19 is obtained by adding a DLL error status similar to that in FIG. 14 to the error information of FIG. 18.

As illustrated in FIG. 15, in the second embodiment, the root device (15) of the node 1 sends the OAM extended read including an OAM extended read command to read additional registers (PEnc Status Reg [n:0] and PDec Status Reg [n:0]) in the OAM payload, and a reaf device of the node 2 sends the OAM extended return including an OAM extended return command including results of reading values of the additional registers.

A cause of a latency time for reading the error information is that there are registers exceeding the maximum CAD that can be designated in one transmission unit of the uplink. Therefore, in the second embodiment, the OAM extended read, which is a read command to read the aggregated error information and the OAM extended return, which is a result thereof, are allocated to one CAD.

In a case where error write occurs in an internal register of each PEnc and each PDec, each PEnc/PDec notifies the DLL (66) of the error write, and the DLL (66) writes 1'b1 indicating the occurrence of an error into a corresponding bit of PEnc Status Reg [n:0] or PDec Status Reg [n:0] of the DLL register (67).

Specifically, in a case where there is write in PDec #0 Reg (63), PDec #0 notifies the DLL (66) of a PDec error, and the DLL (66) writes 1'b1 indicating that the write has occurred in PDec #0 Reg into PDec Status [0] of the DLL register (67).

Similarly, in a case where there is write in PDec #1 Reg (73), the DLL (66) writes 1'b1 indicating that the write has occurred in PDec #1 Reg into PDec Status [1] of the DLL register (67). In a case where there is write in PEnc #0 Reg (61), the DLL (66) writes 1'b1 indicating that the write has occurred in PEnc #0 Reg into PEnc Status [0] of the DLL register (67).

The DLL (66) sends pieces of information of PEnc Status Reg [n:0] and PDec Status Reg [n:0] of the DLL register (67) to PEnc #0 (60). When PDec #0 (62) receives the OAM extended read from the node 1, PEnc #0 (60) generates an OAM packet of the OAM extended return including pieces of the information of PEnc Status [n:0] (see FIG. 18) and PDec Status [n:0] (see FIG. 18) in the OAM payload, and sends the OAM packet to the node 1.

As a result, as illustrated in FIG. 17, in the downlink #64 and the downlink/#128, the node 2 (115) can send the error information of all of PEnc (60, 70, 80, and 90) and PDec (62, 72, 82, and 92) to the node 1 (15) by the OAM extended return in one transmission unit of the downlink, and it is possible to eliminate the latency time in steps S6 to S8 of FIG. 8 and steps S16 to S18 of FIG. 9.

In this manner, in the second embodiment, the root device (15) of the node 1 sends the OAM payload of the OAM extended read that includes a sending request command for the error information of all of PEnc (60, 70, 80, and 90) and PDec (62, 72, 82, and 92) in the leaf device (115), and the leaf device (115) of the node 2 that has received OAM extended read sends the OAM payload of an OAM return that includes the above-described error information. Therefore, the error information of all of PEnc (60, 70, 80, and 90) and PDec (62, 72, 82, and 92) in the leaf device (115) can be sent by one OAM return, and the latency time until the transmission of the error information is completed can be eliminated.

Third Embodiment

In the first and second embodiments, the registers (PEnc Status Reg [n:0] and PDec Status Reg [n:0]) storing error information are added to the DLL register (67) of the leaf device (115) of the node 2. However, there is a problem of when and how to clear the error information in these registers.

Figure 20:
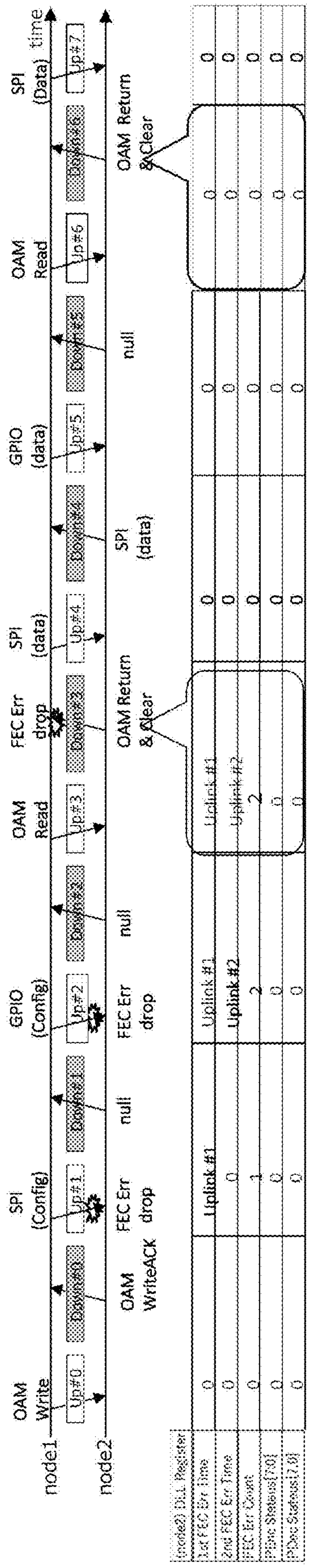
FIG. 20 is a view illustrating a first example of a defect caused by clearing of PEnc Status Reg [n:0] and PDec Status Reg [n:0].

FIG. 20 is a view illustrating a first example of a defect caused by clearing of PEnc Status Reg [n:0] and PDec Status Reg [n:0]. In FIG. 20, in a case where the node 2 clears the above-described registers after sending an OAM return in the downlink #3 and the node 1 is not able to receive the OAM return for some reason, even if the node 1 requests the node 2 to send error information again in OAM read in the uplink #6, wrong information is set to the node 1 in the downlink #6 because the error information has already been cleared. Normally, it is necessary to transmit the error information, held in the registers during the uplink #3, in the downlink #6 as well, but if the registers are cleared after the OAM return including the error information is sent in the downlink #3, it is not possible to send the error information again afterward.

Figure 21:
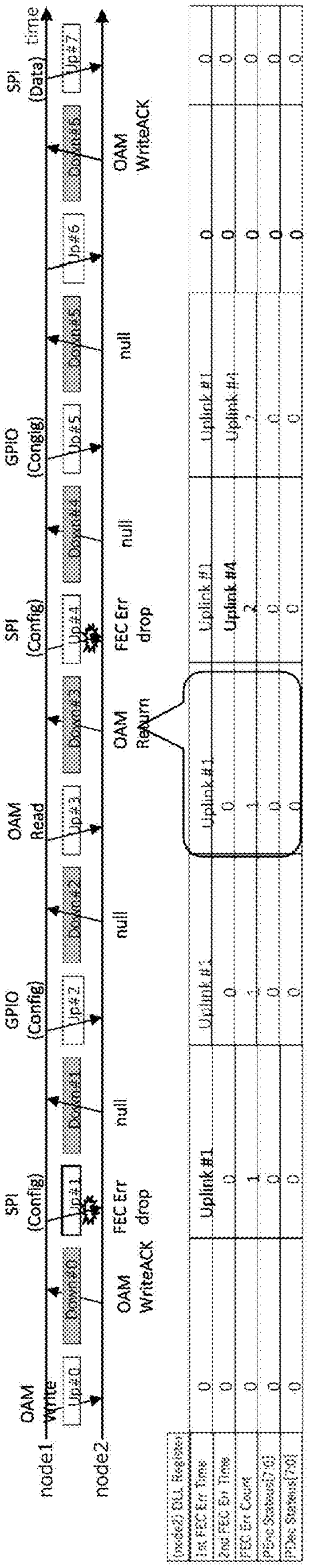
FIG. 21 is a view illustrating a second example of the defect caused by clearing of PEnc Status Reg [n:0] and PDec Status Reg [n:0].

FIG. 21 is a view illustrating a second example of a defect caused by clearing of PEnc Status Reg [n:0] and PDec Status Reg [n:0]. In FIG. 21, in a case where the node 1 sends a clear signal to the node 2 after receiving an OAM return in the downlink #3, the OAM including the clear signal is sent in the uplink #6. If a new error occurs in the uplink #4 during that time, error information is cleared when the OAM is transmitted in the uplink #6 so that it is not possible to send the error information of the uplink #4 to the node 1.

Figure 22:
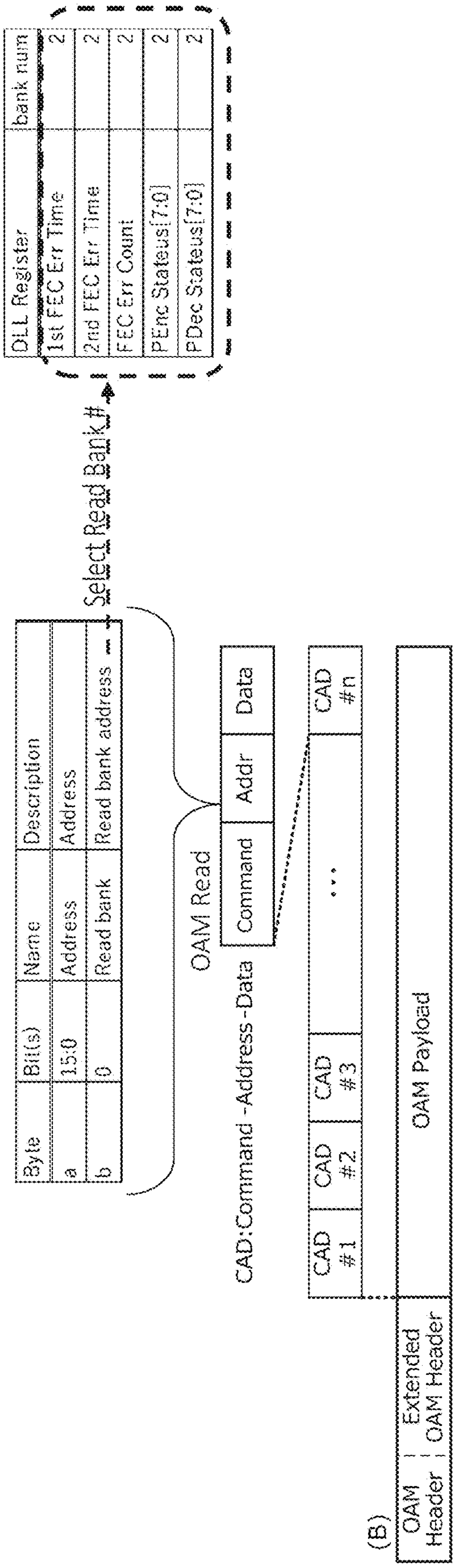
FIG. 22 is a view illustrating a configuration of OAM read in a first solution.

FIGS. 11 and 22 are views illustrating a first solution to solve the defects of FIGS. 20 and 21. FIG. 22 illustrates a configuration of OAM read. As illustrated in FIG. 22, in a case where an i-th byte (mode select [1:0]) of an OAM header of the OAM read indicates an extended OAM header (2'b01) and a command of CAD is the OAM read, a b-th byte designating Read Bank is added to the subsequent address section.

A register of error information newly added to the DLL register (67) has two banks, and the error information corresponding to the designated Read Bank is selected.

Next, the leaf device (115) of the node 2 clears bank information that the root device (15) of the node 1 has not designated in Read Bank. The root device (15) sequentially designates a plurality of banks. Therefore, the error information of a bank that is not designated by the root device (15) indicates having been already received by the root device (15). Thus, in a case where the root device (15) designates any bank, the error information of the other banks can be cleared.

Figure 23:
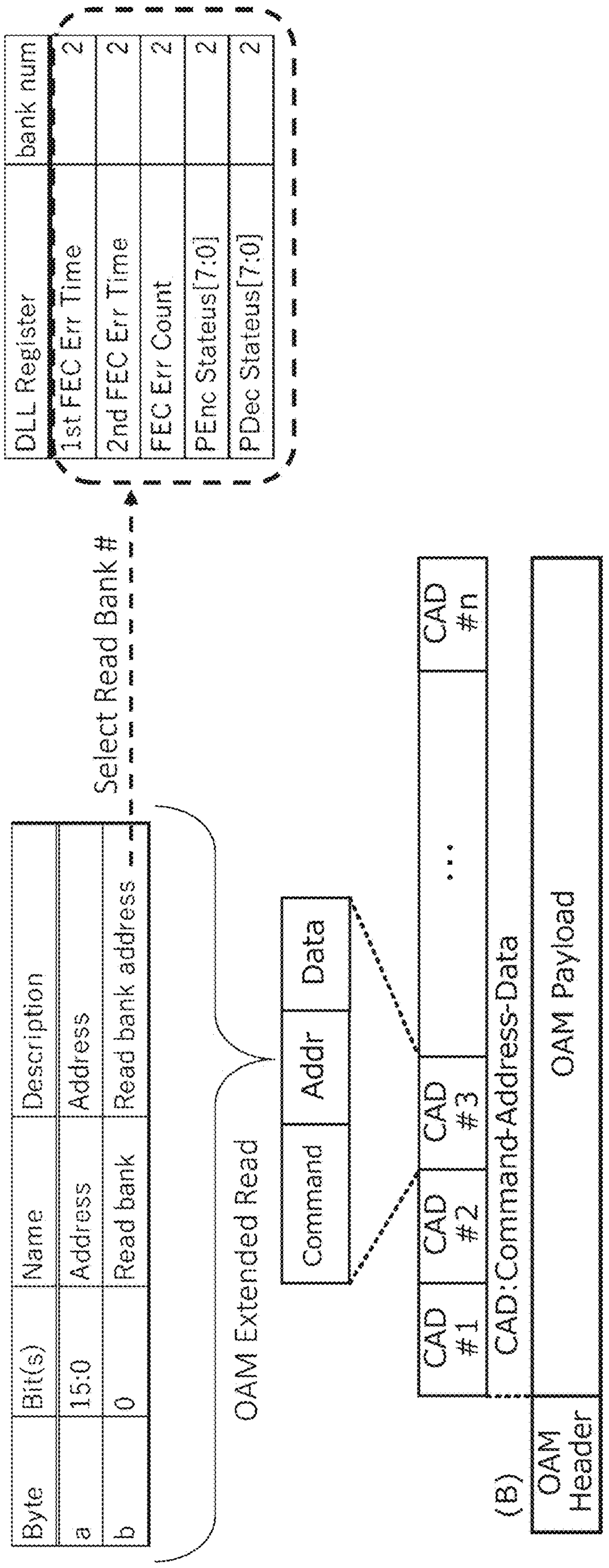
FIG. 23 is a view illustrating a configuration of OAM extended read in a second solution.

FIGS. 16 and 23 are views illustrating a second solution to solve the defects in FIGS. 20 and 21. In the second solution, OAM extended read is sent from the node 1 to the node 2. FIG. 23 is a view illustrating a configuration of the OAM extended read.

A b-th byte designating Read Bank is added to an address section subsequent to an OAM extended read command. In the b-th byte, an address of a bank to be desirably read is described.

The node 2 that has received OAM extended read command reads error information of the bank corresponding to the address of Read Bank from the DLL register (67), and sends the error information in the state of being included in an OAM payload of the an OAM extended return.

Figure 24:
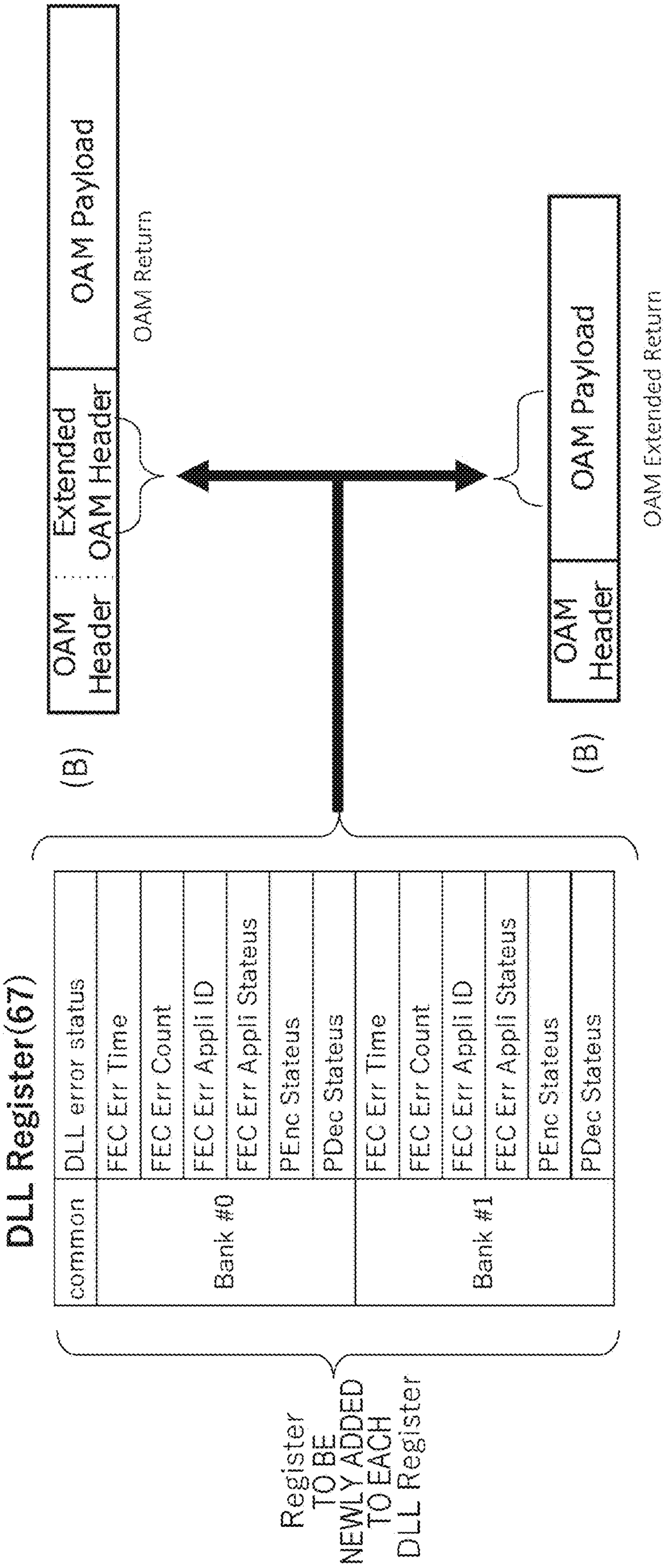
FIG. 24 is a view illustrating a configuration of a DLL register (67) of a leaf device according to a third embodiment.

FIG. 24 is a view illustrating a configuration of the DLL register (67) of the leaf device (115) according to the third embodiment. The DLL register (67) illustrated in FIG. 24 includes a DLL error status as information common to two banks Bank #0 and Bank #1. Furthermore, the DLL register (67) stores error information in every Bank #0 and Bank #1. The error information includes, for example, FEC Err Time, FEC Err Count, FEC Err Appli ID, FEC Err Appli Status, PEnc Status, and PDEc Status.

In the first solution, the error information of one of the banks is included in the extended OAM header of the OAM return and sent to the node 1 as illustrated in the upper right of FIG. 24.

In the second solution, the error information of one of the banks is included in OAM payload as a response result of the OAM extended return command and sent to the node 1 as illustrated in the lower right of FIG. 24.

In this manner, in a case where a request for sending of the error information of any one of the plurality of banks is included in the OAM read command, the OAM unit (65) of the leaf device (115) includes the error information of the corresponding bank in the response result of the OAM return.

The DLL (66) clears the error information of the bank other than the bank for which the sending request has been made in the OAM read from the DLL register (67). The DLL (66) stores newly generated error information in corresponding fields of all the banks of the DLL register (67) every transmission unit.

Figure 25:
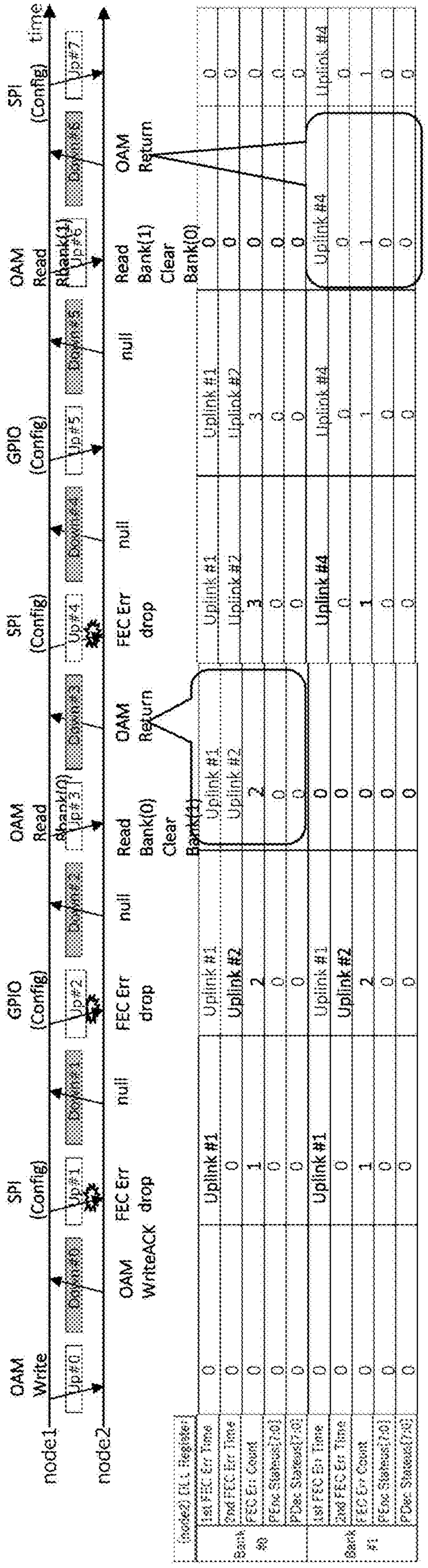
FIG. 25 is a view illustrating a first example in which data transfer is performed between the node 1 and the node 2 by applying the third embodiment.

FIG. 25 is a view illustrating a first example in which data transfer is performed between the node 1 and the node 2 by applying the third embodiment.

All the registers (PEnc Status Reg [n:0] and PDec Status Reg [n:0]) of the error information added to the DLL register (67) are reset at the time of power on.

In the uplink #0, the node 1 sends OAM write to the node 2. In the downlink #0, the node 2 sends a write result as WriteACK to the node 1 since the received OAM write has been successfully written.

In the uplink #1, the node 1 sends Config data of SPI to the node 2, but is affected by noise during transmission. Although the node 2 attempts to recover an error in the received data by FEC, the received data is discarded because an FEC error occurs, and error information is written in the DLL register (67). This error information (1st FEC Err Time and FEC Err Count) is written into both Bank #0 and Bank #1 of the DLL register (67). In the downlink #1, the node 2 sends empty data to the node 1, but the node 1 does not notice an abnormality in a response result received from the node 2.

In the uplink #2, the node 1 sends Config data of GPIO to the node 2, but is affected by noise during transmission. Although the node 2 attempts to recover an error in the received data by FEC, the received data is discarded because an FEC error occurs, and error information is written in the DLL register (67). This error information (2nd FEC Err Time and FEC Err Count) is written into both Bank #0 and Bank #1 of the DLL register (67). In the downlink #2, the node 2 sends empty data to the node 1, but the node 1 does not notice an abnormality in a response result received from the node 2.

In the uplink #3, the node 1 sends OAM read designating Read Bank #0 to the node 2 to know transmission results of the uplink #0 to the uplink #3. The node 2 clears error information of the bank other than the read bank designated by the received OAM read. In the downlink #3, the node 2 sends error information of Bank #0 of the DLL register (67) designated by an address of a received OAM read command to the node 1 as a result of an OAM return. From the received OAM return, the node 1 grasps that the node 2 has failed in reception in the uplink #1 and the uplink #2.

In the uplink #4, the node 1 sends Config data of SPI to the node 2 again, but is affected by noise during transmission. Although the node 2 attempts to recover an error in the received data by FEC, the received data is discarded because an FEC error occurs, and error information is written in the DLL register (67). This error information (1st FEC Err Time and FEC Err Count) is written into Bank #0 and Bank #1 of the DLL register (67), but FEC Err Time in Bank #0 has already been written and thus, the write fails. However, FEC Err Count is added to be 3 from 2.

On the other hand, a write result is reflected in 1st FEC Err Time and FEC Err Count on Bank #1 side cleared in the uplink #3. In the downlink #4, the node 2 sends empty data to the node 1.

In the uplink #5, the node 1 sends Config data of GPIO to the node 2. The node 2 writes Config of GPIO from the received data. In the downlink #5, the node 2 sends empty data to the node 1.

In the uplink #6, the node 1 sends OAM read designating Read Bank #1 to the node 2 to know transmission results of the uplink #4 to the uplink #6. The node 2 clears information of the bank other than the read bank designated by the received OAM read. In the downlink #6, the node 2 sends error information of Bank #1 of the DLL register (67) designated by an address of a received OAM read command to the node 1 as a result of an OAM return. From the received OAM return, the node 1 grasps that the node 2 has failed in reception in the uplink #4.

In the uplink #7, the node 1 sends Config data of SPI to the node 2 again. The node 2 writes Config of SPI from the received data.

Figure 26:
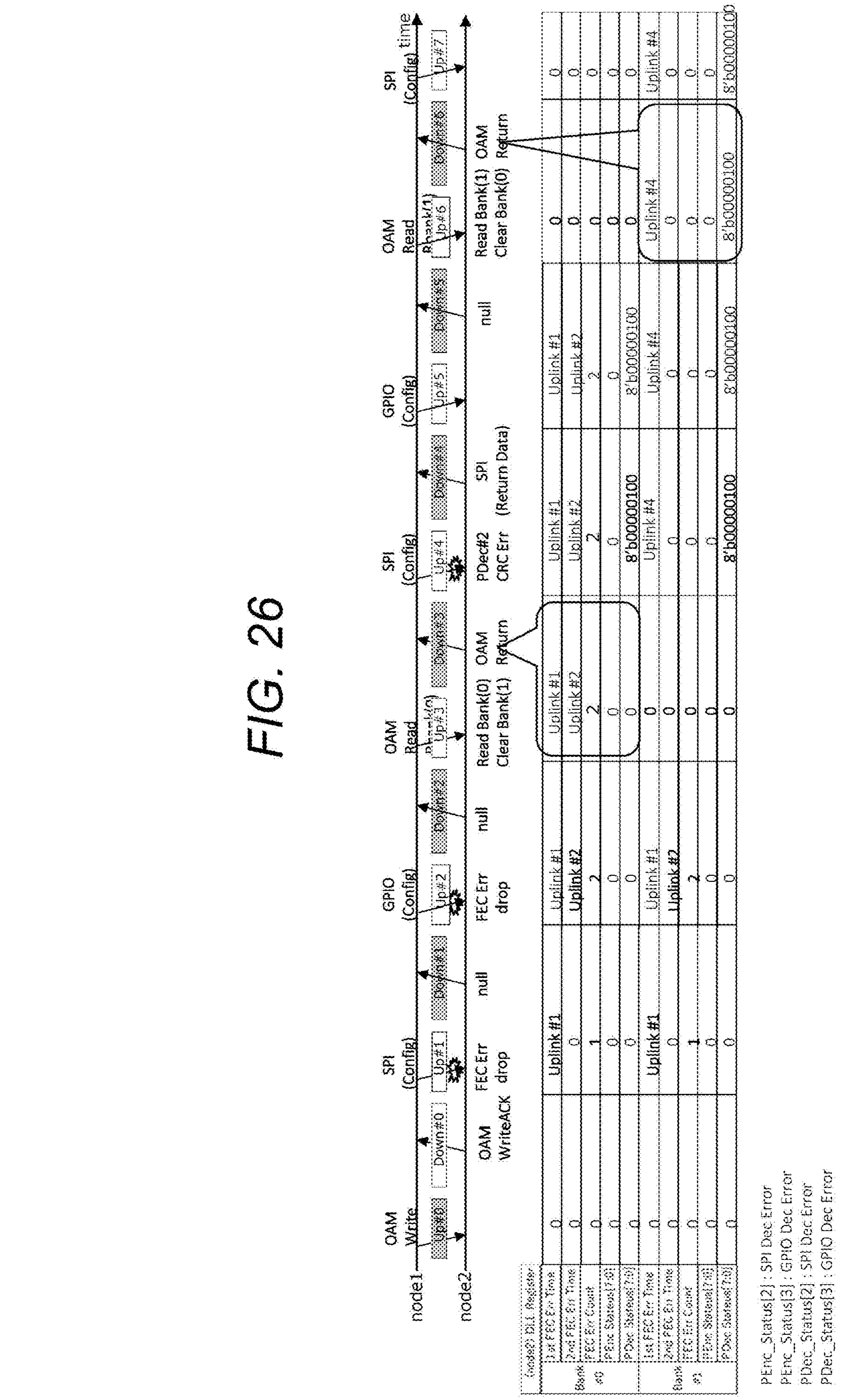
FIG. 26 is a view illustrating a second example in which data transfer is performed between the node 1 and the node 2 by applying the third embodiment.

FIG. 26 is a view illustrating a second example in which data transfer is performed between the node 1 and the node 2 by applying the third embodiment.

From the uplink #0 to a downlink #3, the same as that in FIG. 25 applies. In the uplink #4, the node 1 sends Config data of SPI to the node 2 again, but is affected by noise during transmission. Although the node 2 has recovered an error for the received data by FEC, a CRC error occurs in PDec #2 (82). The node 2 records information regarding the occurrence of the CRC error in PDec #2 register (83), and writes 1'b1 indicating that the CRC error has occurred in PDec #2 into PDec Status [2] of each of Bank #0 and Bank #1 of the DLL register (67). In the downlink #4, the node 2 sends return data of SPI to the node 1.

In the uplink #5, the node 1 sends Config data of GPIO to the node 2. The node 2 writes Config of GPIO from the received data. In the downlink #5, the node 2 sends empty data to the node 1.

In the uplink #6, the node 1 sends OAM read designating Read Bank #1 to the node 2 to know transmission results of the uplink #4 to the uplink #6. The node 2 clears information of the bank other than the read bank designated by the received OAM read. In the downlink #6, the node 2 sends data including Bank #1 of the DLL register (67) designated by an address of a received OAM read command to the node 1 as a result of an OAM return. From the received OAM return, the node 1 grasps that the CRC error has occurred when the node 2 receives the SPI in the uplink #4.

In the uplink #7, the node 1 sends Config data of SPI to the node 2 again. The node 2 writes Config of SPI from the received data.

Figure 27:
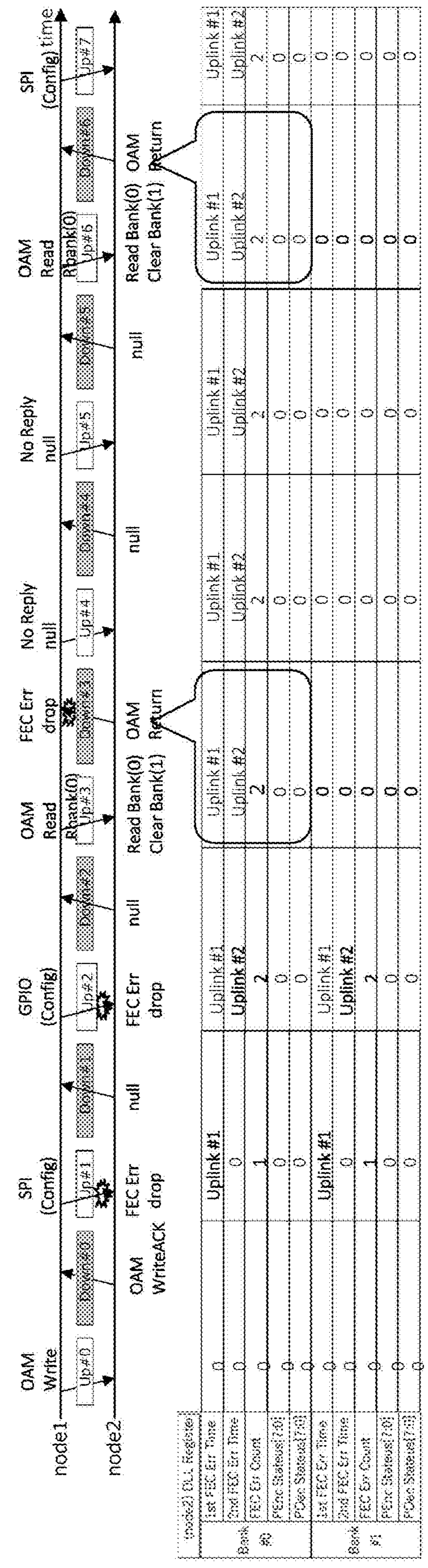
FIG. 27 is a view illustrating a third example in which data transfer is performed between the node 1 and the node 2 by applying the third embodiment.

FIG. 27 is a view illustrating a third example in which data transfer is performed between the node 1 and the node 2 by applying the third embodiment.

From the uplink #0 to the downlink #2, the same as that in FIG. 25 applies. In the uplink #3, the node 1 sends OAM read designating Read Bank #0 to the node 2 to know transmission results of the uplink #0 to the uplink #3. The node 2 clears information of the bank other than the read bank designated by the received OAM read. In the downlink #3, the node 2 sends data including Bank #0 of the DLL register (67) designated by an address of a received OAM read command to the node 1 as a result of an OAM return, but is affected by noise during transmission. Although the node 1 attempts to recover an error in the received data by FEC, the node 2 discards the received data as an FEC error and writes error information in the DLL register (57).

In the uplink #4, the node 1 waits for a response result of the uplink #3. In the downlink #4, the node 2 sends empty data to the node 1.

In the uplink #5, the node 1 waits for the response result of the uplink #3. In the downlink #5, the node 2 sends empty data to the node 1.

In the uplink #6, the node 1 sends OAM read designating Read Bank #0 to the node 2 again to know transmission results of the uplink #1 to the uplink #6. In the downlink #6, the node 2 sends data including Bank #0 of the DLL register (67) designated by an address of a received OAM read command to the node 1 as a result of an OAM return. Furthermore, information of the bank other than Bank #1 is cleared. From the received OAM return, the node 1 grasps that the node 2 has failed in reception in the uplink #1/#2.

In the uplink #7, the node 1 sends Config data of SPI to the node 2 again. The node 2 writes Config of SPI from the received data.

In this manner, in the third embodiment, various types of error information including the error information of all of PEnc (60, 70, 80, and 90) and PDec (62, 72, 82, and 92) in the leaf device (115) of the node 2 are stored in the DLL register (67) for every bank, and when there is a request for sending error information designating a bank from the root device (15) of the node 1, the error information of the designated bank is returned to the root device (15) by the OAM return, and error information of an undesignated bank is cleared. Thus, when the root device (15) fails to acquire the error information of the designated bank and the root device (15) designates the same bank and makes the sending request again, the error information of the bank can be correctly sent again. Therefore, even if failing to acquire the error information from the leaf device (115), the root device (15) can correctly acquire the error information by making the sending request again.

Fourth Embodiment

Although an example in which various types of error information including the error information of all of PEnc (60, 70, 80, and 90) and PDec (62, 72, 82, and 92) in the leaf device (115) of the node 2 are stored in the DLL register (67) for every bank has been described in the third embodiment described above, any type of error information may be stored in the DLL register (67) for every bank, and it is not always necessary to store the error information of all of PEnc (60, 70, 80, and 90) and PDec (62, 72, 82, and 92) in the leaf device (115) in the DLL register (67) for every bank. The error information may be error correction impossibility information detected using a CRC. The error correction impossibility information may include the number of times of error detection.

Figure 28:
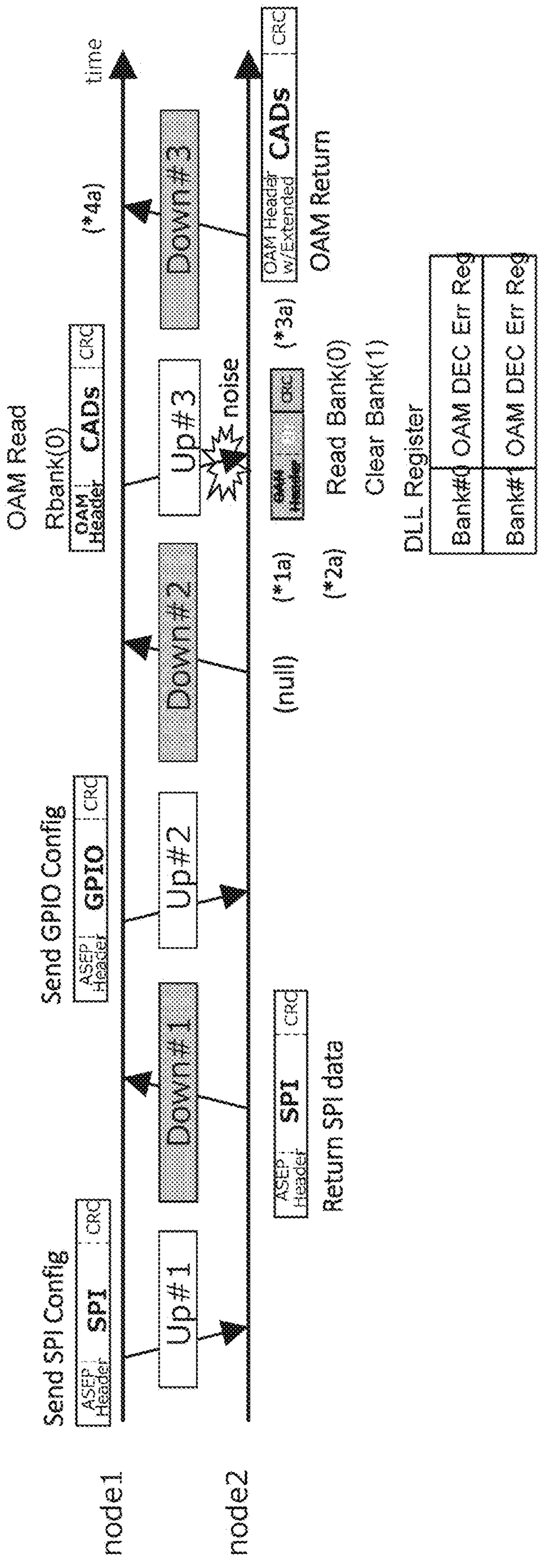
FIG. 28 is a view illustrating an example in which an OAM DEC Err register is provided for every bank.

FIG. 28 is a view illustrating an example in which the DLL register (67) includes two Bank #0 and Bank #1 and an OAM DEC Err register is provided for every bank. The OAM DEC Err register is a register that stores the number of times PDec #0 of the OAM unit has detected an error.

In the uplink #3 of FIG. 28, PDec #0 (62) detects an error of an OAM packet on the basis of a CRC included in the OAM packet. When an error is detected, PDec #0 (62) sends an error detection signal CRC Err to the DLL (66). The DLL (66) counts up a value of OAM DEC error Reg of each of Bank #0 and Bank #1 in the DLL register (67).

In the downlink #3, the DLL (66) in the node 2 generates an OAM return for the node 1 via PEnc #0 (60). In a case where the node 2 sends the OAM return that is a response to the node 1, an OAM packet including an extended OAM header in which a register value of OAM DEC Err Reg of Bank #0 in the DLL register (67) is added to an existing OAM header of the OAM packet is generated. The ECU (10) can determine whether or not OAM read received by the leaf device (115) located in the node 2 has normally operated from the value of OAM DEC Err Reg included in the OAM header received by the root device (15) located in the node 1.

Figure 29:
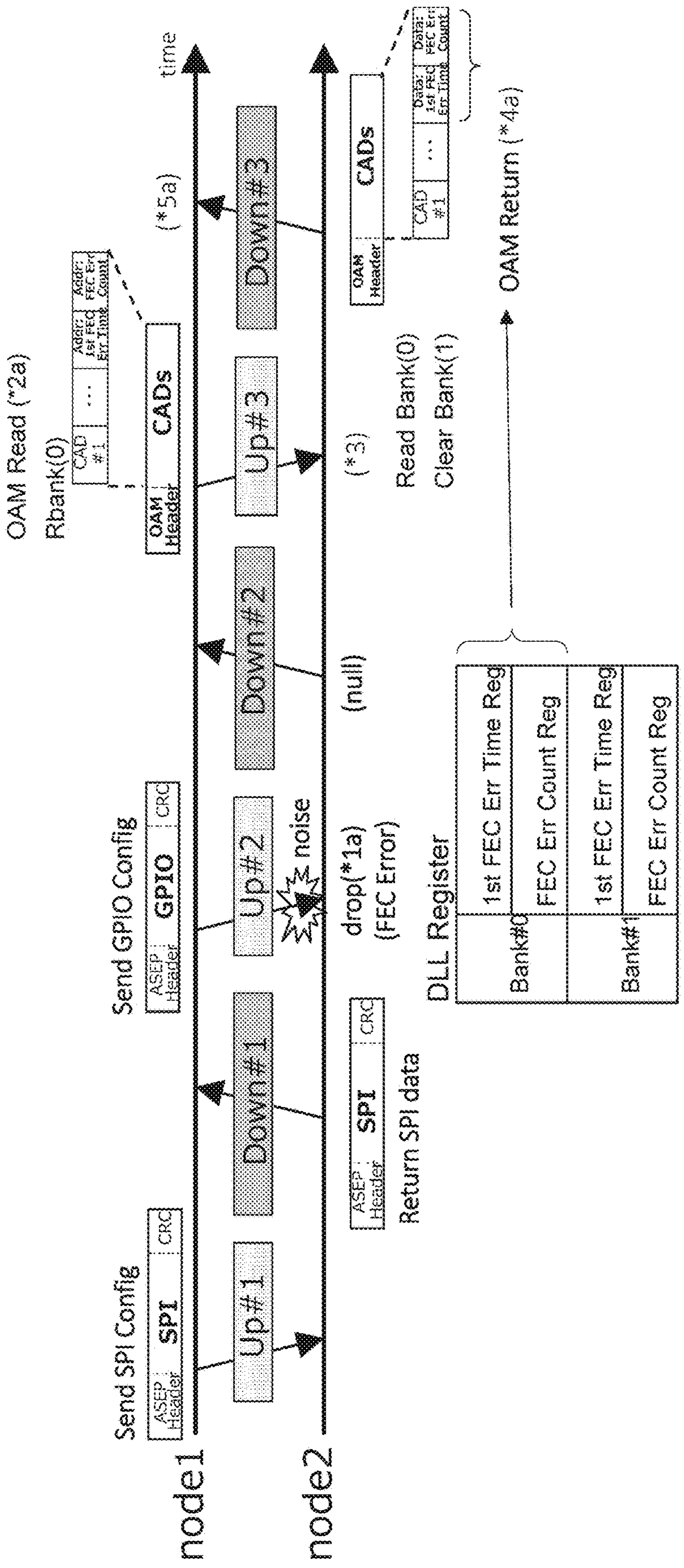
FIG. 29 is a view illustrating an example in which a 1st FEC Err Time register and an FEC Err Count register are provided for every Bank #0 and Bank #1 in the DLL register.

FIG. 29 is a view illustrating an example in which a 1st FEC Err Time register and an FEC Err Count register are provided for every Bank #0 and Bank #1 in the DLL register (67). If an FEC error occurs for the first time, the DLL (66) writes the occurrence time of the FEC error into 1st FEC Err Time Reg of each of Bank #0 and Bank #1 of the DLL register (67), and does not perform overwrite in a case where the occurrence time of the FEC error has already been written in 1st FEC Err Time Reg. Furthermore, the DLL (66) counts up FEC Err Count Reg of each of Bank #0 and Bank #1 in the DLL register (67) every time an FEC error occurs.

In the uplink #2, in PhyL (300) of the node 2, a data payload of a received PHY format (FIG. 4A(D)) exceeds an error correction limit of FEC, and an FEC error occurs. In this case, PhyL (300) discards the data payload in which the FEC error has occurred, and notifies the controller (116) that the FEC error has occurred.

The controller (116) notifies the DLL (66) that the FEC error has occurred, and the DLL (66) writes the occurrence time of the FEC error in 1st FEC Err Time Reg of each of Bank #0 and Bank #1 of the DLL register (67) if the FEC error occurs for the first time, and does not write the occurrence time of the FEC error in the case where the occurrence time of the FEC error has already been written in 1st FEC Err Time Reg. Furthermore, the DLL (66) counts up FEC Err Count Reg of each of Bank #0 and Bank #1 in the DLL register (67) every time an FEC error occurs (*1*a*).

In the uplink #3, the ECU (10) sends, to the node 2 via the node 1, an OAM packet (FIG. 4B(A)) including an OAM read command to confirm whether the node 2 has normally received Config information of SPI and GPIO.

An OAM payload of the OAM packet (FIG. 4B(A)) includes bank information to be read by the DLL register (67) of the node 2 and a read address indicating 1st FEC Err Time Reg and FEC Err Count Reg newly added to the DLL register (67) are included together with the OAM read command (*2*a*).

In the downlink #3, the node 2 reads each register value including 1st FEC Err Time Reg and FEC Err Count Reg of Bank #0 in the DLL register (67) according to the read address of the OAM read command received from the node 1. The node 2 adds the read register values as CAD to the OAM payload as a result of an OAM return and sends the OAM payload to the node 1 (*4*a*). The OAM read (first OAM packet) may include n pieces of first address information designating n pieces of reception time information in the registers and second address information designating total number information in the registers.

The ECU (10) can know the number of times of occurrence of the FEC error in the node 2 and the first FEC error occurrence time from the OAM return received by the node 1, and it can be seen that the ECU (10) only needs to send Config information of GPIO to the node 2 (*5*a*).

Figure 30:
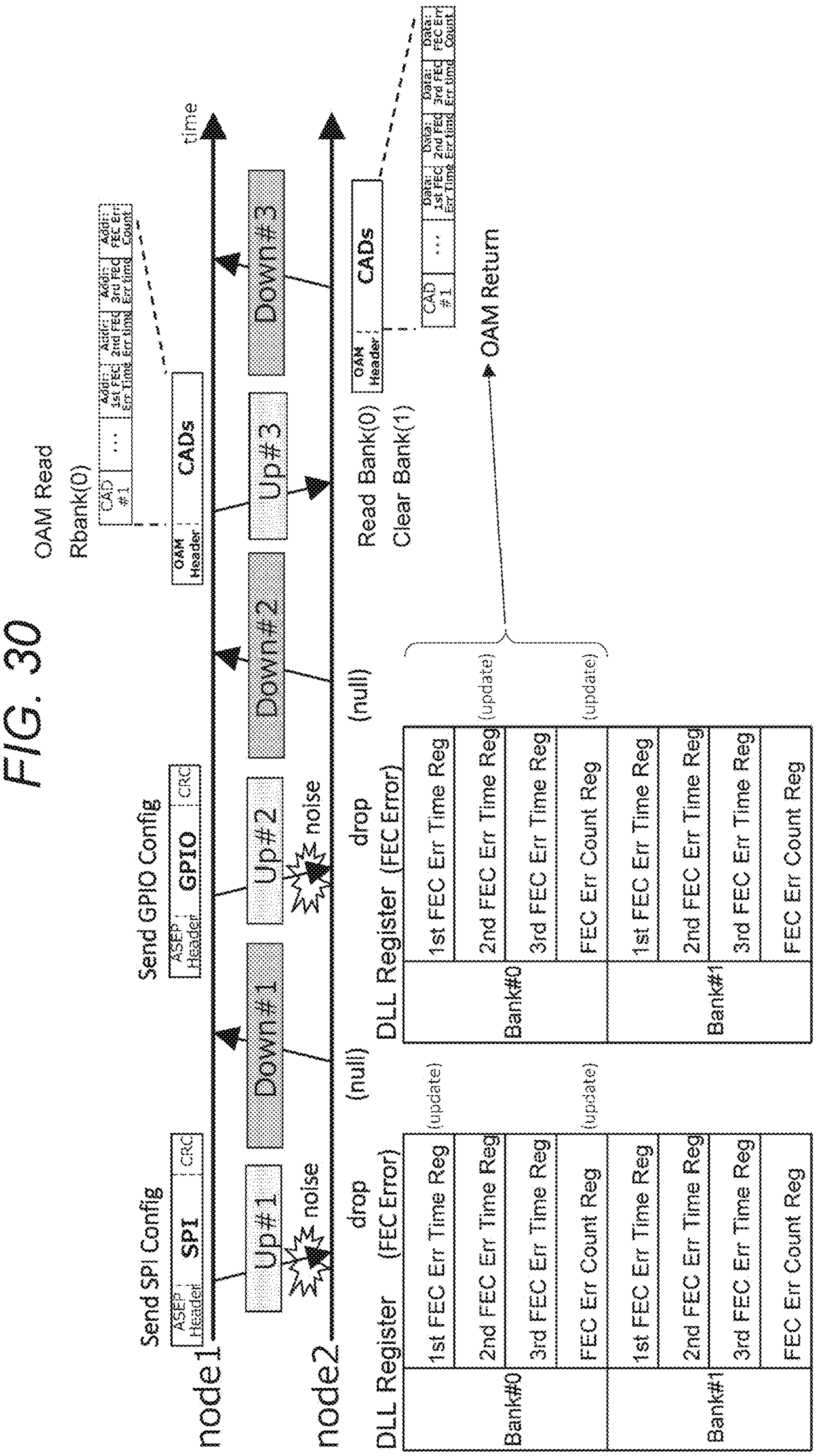
FIG. 30 is a view illustrating an example in which a 1st FEC Err Time register, the 1st FEC Err Time register, a 2nd FEC Err Time register, a 3rd FEC Err Time register, and an FEC Err Count register are provided in the DLL register for every Bank #0 and Bank #1.

FIG. 30 is a view illustrating an example in which the 1st FEC Err Time register, a 2nd FEC Err Time register, a 3rd FEC Err Time register, and the FEC Err Count register are provided in the DLL register (67) for every Bank #0 and Bank #1. Note that any number of FEC Err Time registers may be provided. Therefore, the time at which an FEC error has occurred can be recorded in FEC Err Time Reg in the DLL register (67) three times starting from the first FEC error.

The node 1 can read any register by OAM read. In this example, 2nd FEC Err Time and 3rd FEC Err Time are added to the DLL register (67) in FIG. 29.

The node 1 also adds addresses of 2nd FEC Err Time and 3rd FEC Err Time to a read address of the OAM read, so that the node 2 also returns register values of 2nd FEC Err Time and 3rd FEC Err Time to the node 1 by an OAM return. The ECU (10) can know the occurrence time of each of the first and second FEC errors (the uplink #1 and the uplink #2) and the number of the FEC errors (two times) from a result of the OAM return received by the node 1.

In this manner, in the fourth embodiment, any error information is stored in the DLL register (67) for every bank, and when there is a request for sending error information designating a bank from the root device (15) of the node 1, the leaf device (115) of the node 2 can return the error information of the designated bank to the root device (15) in the OAM return.

Note that the present technology can have the following configurations.

(1) A communication apparatus that sends and receives information to and from a communication partner apparatus alternately within a period allocated by a time division duplex (TDD) communication scheme, the communication apparatus including:

a PHY that receives a first transmission signal conforming to a predetermined communication protocol from the communication partner apparatus, performs error correction on a plurality of first packets included in the first transmission signal, and sends a second transmission signal, which needs to be sent to the communication partner apparatus, to the communication partner apparatus;

a LINK that separates the plurality of first packets and aggregates a plurality of second packets included in the second transmission signal to send the aggregated second packets to the PHY;

a plurality of decoders that decodes the plurality of first packets; and a plurality of encoders that generates the plurality of second packets, in which the PHY includes an error information storage unit that stores error information regarding each of the plurality of decoders and the plurality of encoders, and an operation-administration-maintenance (OAM) unit that includes the error information in one second packet of the plurality of second packets.

(2) The communication apparatus according to (1), in which the error information storage unit stores the error information indicating, by one bit, whether or not an error occurs in each of the plurality of decoders and the plurality of encoders.

(3) The communication apparatus according to (1) or (2), in which the error information stored in the error information storage unit includes error information regarding each of a decoder and an encoder included in the OAM unit.

(4) The communication apparatus according to any one of (1) to (3), in which the PHY performs the error correction on the plurality of first packets included in the first transmission signal, the LINK generates the second packet including error correction impossibility information for which the PHY has failed to correctly perform the error correction, and the error information includes reception time information of the first packets in which first and second failures have occurred in the error correction within a transmission unit of the TDD communication scheme, total number information of the first packets in which failures have occurred in the error correction within the transmission unit, and identification information of the first packets in which the first and second failures have occurred in the error correction within the transmission unit.

(5) The communication apparatus according to any one of (1) to (4), in which the error information includes error information of the LINK.

(6) The communication apparatus according to (5), in which the LINK includes:

a first storage unit that stores information indicating a case where there is no information regarding a sending destination in a schedule table or indicating occurrence of an abnormality that the sending destination does not exist;

a second storage unit that stores information indicating a case where there is no received data or indicating occurrence of an abnormality during a receiving operation; and a third storage unit that stores information indicating that the received data is partially missing, and the error information of the LINK includes the information stored in the first storage unit, the second storage unit, and the third storage unit.

(7) The communication apparatus according to any one of (1) to (6), in which the plurality of first packets includes at least one of an application packet or a first OAM packet, and the second packet generated by the OAM unit includes a second OAM packet generated in response to reception of the first OAM packet.

(8) The communication apparatus according to (7), in which the first OAM packet includes a first header and a first payload, the first header or the first payload includes a request for sending of the error information, and the OAM unit includes the error information in the second OAM packet in a case where the first OAM packet includes the request for sending of the error information.

(9) The communication apparatus according to (8), in which the second OAM packet includes a second header and a second payload, the request for sending of the error information is included in the first header, and the OAM unit includes the error information in the second header of the second OAM packet in a case where the first header includes the request for sending of the error information.

(10) The communication apparatus according to (9), in which the second header includes mode select information, and the mode select information is set to a reserved bit of an OAM header of ASA Spec Ver 1.01 in a case where the second header includes the error information.

(11) The communication apparatus according to (8), in which the second OAM packet includes a second header and a second payload, the request for sending of the error information is included in the first payload, and the OAM includes the error information in the second payload of the second OAM packet in a case where the first payload includes the request for sending of the error information.

(12) The communication apparatus according to any one of (7) to (11), in which the error information storage unit includes a plurality of banks storing pieces of the error information generated in mutually different transmission units of the TDD communication scheme, and in a case where a request for sending of the error information of any one bank of the plurality of banks is included in the first OAM packet, the OAM unit includes the error information of the bank in the second OAM packet.

(13) The communication apparatus according to (12), in which the LINK clears the error information of a bank other than the bank for which the sending request has been made in the first OAM packet from the error information storage unit.

(14) The communication apparatus according to (13), in which the LINK stores the error information that is newly generated in at least one or more banks cleared in the error information storage unit in each of the transmission unit.

(15) A communication apparatus that sends and receives information to and from a communication partner apparatus alternately within a period allocated by a time division duplex (TDD) communication scheme, the communication apparatus including:

a PHY that receives a first transmission signal conforming to a predetermined communication protocol from the communication partner apparatus and performs error correction on a plurality of first packets included in the first transmission signal; and a LINK that separates the plurality of first packets after the error correction and generates a second packet including error correction impossibility information of the first packet on which the error correction has not been correctly performed, in which the PHY sends a second transmission signal including the second packet to the communication partner apparatus, the plurality of first packets includes a first OAM packet, the second packet includes a second OAM packet, the LINK includes a register that includes a plurality of banks storing pieces of the error correction impossibility information generated in mutually different transmission units of the TDD communication scheme, and in a case where the first OAM packet includes a request for sending of the error correction impossibility information of any one bank of the plurality of banks, the LINK includes the error correction impossibility information of the bank in the register in the second OAM packet.

(16) The communication apparatus according to (15), in which the error correction impossibility information includes reception time information of an application packet in which a failure has occurred in the error correction for the first time within a transmission unit of the transmission signal and total number information of application packets in which failures have occurred in the error correction within the transmission unit, the first OAM packet includes information designating one bank of the plurality of banks and address information of the register in which the error correction impossibility information of the designated bank is stored, and the address information in the first OAM packet includes first address information designating the reception time information in the register and second address information designating the total number information in the register.

(17) The communication apparatus according to (15), in which the error correction impossibility information includes n (n is an integer of one or more) pieces of reception time information of application packets in which failures have occurred in the error correction starting from the application packet in which the failure has occurred in the error correction for the first time within a transmission unit of the transmission signal and total number information of application packets in which failures have occurred in the error correction within the transmission unit, the first OAM packet includes information designating one bank of the plurality of banks and address information of the register in which the error correction impossibility information of the designated bank is stored, and the address information in the first OAM packet includes the n pieces of first address information designating the n pieces of the reception time information in the register and second address information designating the total number information in the register.

(18) The communication apparatus according to (15), in which the error correction impossibility information includes reception time information of an application packet in which a failure has occurred in the error correction for the first time within a transmission unit of the transmission signal, total number information of application packets in which failures have occurred in the error correction within the transmission unit, identification information of the application packet in which the failure has occurred in the error correction for the first time in the transmission unit of the transmission signal, and bit string information in which whether or not the error correction is impossible is allocated to each of the application packets sent within the transmission unit in units of bits, the first OAM packet includes information designating one bank of the plurality of banks and address information of the register in which the error correction impossibility information of the designated bank is stored, and the address information in the first OAM packet includes first address information designating the reception time information in the register, second address information designating the total number information in the register, third address information designating the identification information in the register, and fourth address information designating the bit string information in the register.

(19) A communication apparatus that sends and receives information to and from a communication partner apparatus alternately within a period allocated by a time division duplex (TDD) communication scheme, the communication apparatus including:

a LINK that generates a transmission packet including a plurality of first packets; and a PHY that generates a first transmission signal conforming to a predetermined communication protocol on the basis of the transmission packet, sends the first transmission signal to the communication partner apparatus, and receives a second transmission signal from the communication partner apparatus, in which the LINK includes an OAM unit that generates, for the communication partner apparatus, a first OAM packet including a request for sending of error information of a plurality of decoders and a plurality of encoders included in the communication partner apparatus, and extracts the error information from a second OAM packet sent from the communication partner apparatus in response to the first OAM packet, and the plurality of first packets includes an application packet and the first OAM packet.

(20) A communication system including:

a first communication apparatus; and a second communication apparatus that sends and receives information to and from the first communication apparatus alternately within a period allocated by a time division duplex (TDD) communication scheme, in which the first communication apparatus includes a PHY that receives a first transmission signal conforming to a predetermined communication protocol from the second communication apparatus, performs error correction on a plurality of first packets included in the first transmission signal, and sends a second transmission signal, which needs to be sent to the second communication apparatus, to the second communication apparatus, a LINK that separates the plurality of first packets and aggregates a plurality of second packets included in the second transmission signal to send the aggregated second packets to the PHY, a plurality of decoders that decodes the plurality of first packets, and a plurality of encoders that generates the plurality of second packets, and the PHY includes an error information storage unit that stores error information regarding each of the plurality of decoders and the plurality of encoders, and an operation-administration-maintenance (OAM) unit that includes the error information in one second packet of the plurality of second packets.

Aspects of the present disclosure are not limited to the above-described respective embodiments, but include various modifications that can be conceived by those skilled in the art, and effects of the present disclosure are not limited to the above-described contents. That is, various additions, changes, and partial deletions can be made within a scope not departing from a conceptual idea and a spirit of the present disclosure derived from the contents defined in the claims and equivalents thereof.

REFERENCE SIGNS LIST

3 Communication system
4 Cable
10 ECU
15 Root device
16 Controller

18 Timer
20 PEnc #1
22 PDec #1
30 PEnc #2
32 PDec #2
40 PEnc #3
42 PDec #3
50 PEnc #0
52 PDec #0
55 OAM unit
57 DLL register
58 Frame constructor
59 Frame de-constructor
65 OAM unit
60 PEnc #0
62 PDec #0
67 DLL Register
68 Frame constructor
69 Frame de-constructor
70 PEnc #1
71, 73, 81, 83 Register
72 PDec #1
80 PEnc #2
82 PDec #2
90 PEnc #3
92 PDec #3
110 Uplink Tx
115 Leaf device
116 Controller
118 Timer
180 Downlink Rx
200 Camera
310 Downlink Tx
380 Uplink Rx

The invention claimed is:

1. A communication apparatus that sends and receives information to and from a communication partner apparatus alternately within a period allocated by a time division duplex (TDD) communication scheme, the communication apparatus comprising:

a processor;

a Physical Layer (PHY) that receives a first transmission signal conforming to a predetermined communication protocol from the communication partner apparatus, performs error correction on a plurality of first packets included in the first transmission signal, and sends a second transmission signal, which needs to be sent to the communication partner apparatus, to the communication partner apparatus;

a Data Link Layer (LINK) that separates the plurality of first packets and aggregates a plurality of second packets included in the second transmission signal to send the aggregated second packets to the PHY;

a plurality of decoders that decodes the plurality of first packets; and a plurality of encoders that generates the plurality of second packets, wherein the PHY includes an error information storage unit that stores error information regarding each of the plurality of decoders and the plurality of encoders, and an operation-administration-maintenance (OAM) unit that includes the error information in one second packet of the plurality of second packets.

2. The communication apparatus according to claim 1, wherein the error information storage unit stores the error information indicating, by one bit, whether or not an error occurs in each of the plurality of decoders and the plurality of encoders.

3. The communication apparatus according to claim 1, wherein the error information stored in the error information storage unit includes error information regarding each of a decoder and an encoder included in the OAM unit.

4. The communication apparatus according to claim 1, wherein the PHY performs the error correction on the plurality of first packets included in the first transmission signal, the LINK generates a corresponding second packet including error correction impossibility information for which the PHY has failed to correctly perform the error correction, and the error information includes reception time information of the first packets in which first and second failures have occurred in the error correction within a transmission unit of the TDD communication scheme, total number information of the first packets in which failures have occurred in the error correction within the transmission unit, and identification information of the first packets in which the first and second failures have occurred in the error correction within the transmission unit.

5. The communication apparatus according to claim 1, wherein the error information includes error information of the LINK.

6. The communication apparatus according to claim 5, wherein the LINK includes:

a first storage unit that stores information indicating a case where there is no information regarding a sending destination in a schedule table or indicating occurrence of an abnormality that the sending destination does not exist;

a second storage unit that stores information indicating a case where there is no received data or indicating occurrence of an abnormality during a receiving operation; and a third storage unit that stores information indicating that the received data is partially missing, and the error information of the LINK includes the information stored in the first storage unit, the second storage unit, and the third storage unit.

7. The communication apparatus according to claim 1, wherein the plurality of first packets includes at least one of an application packet or a first OAM packet, and the one second packet generated by the OAM unit includes a second OAM packet generated in response to reception of the first OAM packet.

8. The communication apparatus according to claim 7, wherein the first OAM packet includes a first header and a first payload, the first header or the first payload includes a request for sending of the error information, and the OAM unit includes the error information in the second OAM packet in a case where the first OAM packet includes the request for sending of the error information.

9. The communication apparatus according to claim 8, wherein the second OAM packet includes a second header and a second payload, the request for sending of the error information is included in the first header, and the OAM unit includes the error information in the second header of the second OAM packet in a case where the first header includes the request for sending of the error information.

10. The communication apparatus according to claim 9, wherein the second header includes mode select information, and the mode select information is set to a reserved bit of an OAM header of ASA Spec Ver 1.01 in a case where the second header includes the error information.

11. The communication apparatus according to claim 8, wherein the second OAM packet includes a second header and a second payload, the request for sending of the error information is included in the first payload, and the OAM includes the error information in the second payload of the second OAM packet in a case where the first payload includes the request for sending of the error information.

12. The communication apparatus according to claim 7, wherein the error information storage unit includes a plurality of banks storing pieces of the error information generated in mutually different transmission units of the TDD communication scheme, and in a case where a request for sending of the error information of any one bank of the plurality of banks is included in the first OAM packet, the OAM unit includes the error information of the bank in the second OAM packet.

13. The communication apparatus according to claim 12, wherein the LINK clears the error information of a bank other than the bank for which the sending request has been made in the first OAM packet from the error information storage unit.

14. The communication apparatus according to claim 13, wherein the LINK stores the error information that is newly generated in at least one or more banks cleared in the error information storage unit in each of the transmission units.

15. A communication apparatus that sends and receives information to and from a communication partner apparatus alternately within a period allocated by a time division duplex (TDD) communication scheme, the communication apparatus comprising:

a processor;

a Physical Layer (PHY) that receives a first transmission signal conforming to a predetermined communication protocol from the communication partner apparatus and performs error correction on a plurality of first packets included in the first transmission signal; and a Data Link Layer (LINK) that separates the plurality of first packets after the error correction and generates a second packet including error correction impossibility information of the first packet on which the error correction has not been correctly performed, wherein the PHY sends a second transmission signal including the second packet to the communication partner apparatus, the plurality of first packets includes a first OAM packet, the second packet includes a second OAM packet, the LINK includes a register that includes a plurality of banks storing pieces of the error correction impossibility information generated in mutually different transmission units of the TDD communication scheme, and in a case where the first OAM packet includes a request for sending of the error correction impossibility information of any one bank of the plurality of banks, the LINK includes the error correction impossibility information of the bank in the register in the second OAM packet.

16. The communication apparatus according to claim 15, wherein the error correction impossibility information includes reception time information of an application packet in which a failure has occurred in the error correction for first time within a transmission unit of the transmission signal and total number information of application packets in which failures have occurred in the error correction within the transmission unit, the first OAM packet includes information designating one bank of the plurality of banks and address information of the register in which the error correction impossibility information of the designated bank is stored, and the address information in the first OAM packet includes first address information designating the reception time information in the register and second address information designating the total number information in the register.

17. The communication apparatus according to claim 15, wherein the error correction impossibility information includes n (n is an integer of one or more) pieces of reception time information of application packets in which failures have occurred in the error correction starting from the application packet in which the failure has occurred in the error correction for first time within a transmission unit of the transmission signal and total number information of application packets in which failures have occurred in the error correction within the transmission unit, the first OAM packet includes information designating one bank of the plurality of banks and address information of the register in which the error correction impossibility information of the designated bank is stored, and the address information in the first OAM packet includes the n pieces of first address information designating the n pieces of the reception time information in the register and second address information designating the total number information in the register.

18. The communication apparatus according to claim 15, wherein the error correction impossibility information includes reception time information of an application packet in which a failure has occurred in the error correction for first time within a transmission unit of the transmission signal, total number information of application packets in which failures have occurred in the error correction within the transmission unit, identification information of the application packet in which the failure has occurred in the error correction for the first time in the transmission unit of the transmission signal, and bit string information in which whether or not the error correction is impossible is allocated to each of the application packets sent within the transmission unit in units of bits, the first OAM packet includes information designating one bank of the plurality of banks and address information of the register in which the error correction impossibility information of the designated bank is stored, and the address information in the first OAM packet includes first address information designating the reception time information in the register, second address information designating the total number information in the register, third address information designating the identification information in the register, and fourth address information designating the bit string information in the register.

19. A non-transitory computer readable medium storing a program for controlling a communication apparatus to send and receive information to and from a communication partner apparatus alternately within a period allocated by a time division duplex (TDD) communication scheme, the program being executable by at least one processor to perform operations comprising:

receiving, by a Physical Layer (PHY), a first transmission signal conforming to a predetermined communication protocol from the communication partner apparatus, performing error correction on a plurality of first packets included in the first transmission signal, and sending a second transmission signal, which needs to be sent to the communication partner apparatus, to the communication partner apparatus;

separating, by a Data Link Layer (LINK), the plurality of first packets and aggregating a plurality of second packets included in the second transmission signal to send the aggregated second packets to the PHY;

decoding, by a plurality of decoders that decodes the plurality of first packets; and generating, by a plurality of encoders, the plurality of second packets, wherein the PHY includes an error information storage unit that stores error information regarding each of the plurality of decoders and the plurality of encoders, and an operation-administration-maintenance (OAM) unit that includes the error information in one second packet of the plurality of second packets.

20. A non-transitory computer readable medium storing a program for controlling a communication apparatus to send and receive information to and from a communication partner apparatus alternately within a period allocated by a time division duplex (TDD) communication scheme, the program being executable by at least one processor to perform operations comprising:

receiving, by a Physical Layer (PHY, a first transmission signal conforming to a predetermined communication protocol from the communication partner apparatus and performing error correction on a plurality of first packets included in the first transmission signal; and separating, by a Data Link Layer (LINK), the plurality of first packets after the error correction and generating a second packet including error correction impossibility information of the first packet on which the error correction has not been correctly performed, wherein the PHY sends a second transmission signal including the second packet to the communication partner apparatus, the plurality of first packets includes a first OAM packet, the second packet includes a second OAM packet, the LINK includes a register that includes a plurality of banks storing pieces of the error correction impossibility information generated in mutually different transmission units of the TDD communication scheme, and in a case where the first OAM packet includes a request for sending of the error correction impossibility information of any one bank of the plurality of banks, the LINK includes the error correction impossibility information of the bank in the register in the second OAM packet.

* * * * *